(12) United States Patent
Matsuoka et al.

(10) Patent No.: US 10,545,517 B2
(45) Date of Patent: *Jan. 28, 2020

(54) GENERATING AND IMPLEMENTING THERMODYNAMIC MODELS OF A STRUCTURE

(71) Applicant: Google LLC, Mountain View, CA (US)

(72) Inventors: Yoky Matsuoka, Los Altos Hills, CA (US); Mark Malhotra, San Mateo, CA (US); Allen J. Minich, San Mateo, CA (US); Joseph A. Ruff, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,290

(22) Filed: Feb. 22, 2018

(65) Prior Publication Data

US 2018/0181149 A1 Jun. 28, 2018

Related U.S. Application Data

(63) Continuation of application No. 13/866,602, filed on Apr. 19, 2013, now Pat. No. 9,910,449.

(51) Int. Cl.
*G05D 23/19* (2006.01)
*G05B 15/02* (2006.01)
(Continued)

(52) U.S. Cl.
CPC ......... *G05D 23/1917* (2013.01); *G05B 15/02* (2013.01); *G05B 17/02* (2013.01);
(Continued)

(58) Field of Classification Search
CPC .. F24F 11/30; F24F 11/46; F24F 11/58; F24F 11/52; G05D 23/1917; G05B 2219/2642; G05B 2219/2614
See application file for complete search history.

(56) References Cited

U.S. PATENT DOCUMENTS 4,223,831 A 9/1980 Szarka
4,298,946 A 11/1981 Hartsell et al.
(Continued)

FOREIGN PATENT DOCUMENTS

CA 2202008 C 2/2000
EP 196069 B1 12/1991
(Continued)

OTHER PUBLICATIONS

Greene, Heat Transfer, Encyclopedia of Physical Science and Technology (Third Edition), 2003, pp. 279-292.
(Continued)

*Primary Examiner* — Ljiljana V. Ciric
*Assistant Examiner* — Alexis K Cox
(74) *Attorney, Agent, or Firm* — Kilpatrick Townsend & Stockton LLP

(57) ABSTRACT

In controlling the HVAC system, a need to determine an expected indoor temperature profile for a particular schedule of setpoint temperatures may arise. To make such a determination, a thermodynamic model of the structure is used. The thermodynamic model is generated by fitting weighting factors of a set of basis functions to a variety of historical data including time information, temperature information, and HVAC actuation state information. The set of basis functions characterize an indoor temperature trajectory of the structure in response to a change in HVAC actuation state, and include an inertial carryover component that characterizes a carryover of a rate of indoor temperature change that was occurring immediately prior to the change in actuation state.

18 Claims, 12 Drawing Sheets

(51) Int. Cl.
*G05B 17/02* (2006.01)
*F24F 11/58* (2018.01)
*F24F 11/52* (2018.01)

(52) U.S. Cl.
CPC .............. *F24F 11/52* (2018.01); *F24F 11/58* (2018.01); *G05B 2219/2614* (2013.01); *G05B 2219/2642* (2013.01)

(56) References Cited

U.S. PATENT DOCUMENTS

| | | | |
|---|---|---|---|
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 4,847,781 A | 7/1989 | Brown, III et al. | |
| 5,088,645 A | 2/1992 | Bell | |
| 5,211,332 A | 5/1993 | Adams | |
| 5,240,178 A | 8/1993 | Dewolf et al. | |
| 5,395,042 A | 3/1995 | Riley et al. | |
| 5,462,225 A | 10/1995 | Massara et al. | |
| 5,476,221 A | 12/1995 | Seymour | |
| 5,499,196 A | 3/1996 | Pacheco | |
| 5,544,036 A | 8/1996 | Brown, Jr. et al. | |
| 5,555,927 A | 9/1996 | Shah | |
| 5,611,484 A | 3/1997 | Uhrich | |
| 5,761,083 A | 6/1998 | Brown, Jr. et al. | |
| 5,816,491 A | 10/1998 | Berkeley et al. | |
| 5,902,183 A | 5/1999 | D'Souza | |
| 5,909,378 A | 6/1999 | De Milleville | |
| 5,977,964 A | 11/1999 | Williams et al. | |
| 6,062,482 A | 5/2000 | Gauthier et al. | |
| 6,098,893 A | 8/2000 | Berglund et al. | |
| 6,122,603 A | 9/2000 | Budike, Jr. | |
| 6,216,956 B1 | 4/2001 | Ehlers et al. | |
| 6,311,105 B1 | 10/2001 | Budike, Jr. | |
| 6,349,883 B1 | 2/2002 | Simmons et al. | |
| 6,356,204 B1 | 3/2002 | Guindi et al. | |
| 6,574,581 B1 | 6/2003 | Bohrer et al. | |
| 6,643,567 B2 | 11/2003 | Kolk et al. | |
| 6,645,066 B2 | 11/2003 | Gutta et al. | |
| 6,769,482 B2 | 8/2004 | Wagner et al. | |
| 6,785,630 B2 | 8/2004 | Kolk et al. | |
| 6,975,958 B2 | 12/2005 | Bohrer et al. | |
| 7,024,336 B2 | 4/2006 | Salsbury et al. | |
| 7,072,727 B1 | 7/2006 | Davis | |
| 7,333,880 B2 | 2/2008 | Brewster et al. | |
| 7,346,467 B2 | 3/2008 | Bohrer et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,854,389 B2 | 12/2010 | Ahmed | |
| 7,908,116 B2 | 3/2011 | Steinberg et al. | |
| 7,908,117 B2 | 3/2011 | Steinberg et al. | |
| 8,010,237 B2 | 8/2011 | Cheung et al. | |
| 8,019,567 B2 | 9/2011 | Steinberg et al. | |
| 8,090,477 B1 | 1/2012 | Steinberg | |
| 8,131,497 B2 | 3/2012 | Steinberg et al. | |
| 8,131,506 B2 | 3/2012 | Steinberg et al. | |
| 8,180,492 B2 | 5/2012 | Steinberg | |
| 8,510,255 B2 | 8/2013 | Fadell et al. | |
| 8,554,376 B1 | 10/2013 | Matsuoka et al. | |
| 8,630,740 B2 | 1/2014 | Matsuoka et al. | |
| 8,630,741 B1 | 1/2014 | Matsuoka et al. | |
| 8,635,373 B1 | 1/2014 | Supramaniam et al. | |
| 8,752,771 B2 | 6/2014 | Warren et al. | |
| 8,850,348 B2 | 9/2014 | Fadell et al. | |
| 8,918,219 B2 | 12/2014 | Sloo et al. | |
| 9,091,453 B2 | 7/2015 | Matsuoka et al. | |
| 9,104,211 B2 | 8/2015 | Fadell et al. | |
| 9,261,287 B2 | 2/2016 | Warren et al. | |
| 9,298,197 B2 | 3/2016 | Matsuoka et al. | |
| 9,429,923 B2 | 8/2016 | Ward et al. | |
| 9,595,070 B2 | 3/2017 | Matsuoka et al. | |
| 9,605,858 B2 | 3/2017 | Warren et al. | |
| 9,625,171 B2 | 4/2017 | Macek et al. | |
| 9,810,442 B2 | 11/2017 | Matsuoka et al. | |
| 9,910,449 B2 * | 3/2018 | Matsuoka | G05B 15/02 |
| 2004/0034484 A1 | 2/2004 | Solomita, Jr. et al. | |
| 2004/0249479 A1 | 12/2004 | Shorrock | |
| 2005/0119793 A1 | 6/2005 | Amundson et al. | |
| 2005/0128067 A1 | 6/2005 | Zakrewski | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0186214 A1 | 8/2006 | Simon et al. | |
| 2006/0196953 A1 | 9/2006 | Simon et al. | |
| 2007/0241203 A1 | 10/2007 | Wagner et al. | |
| 2008/0015740 A1 | 1/2008 | Osann | |
| 2008/0015742 A1 | 1/2008 | Kulyk et al. | |
| 2008/0191045 A1 | 8/2008 | Harter | |
| 2008/0217418 A1 | 9/2008 | Helt et al. | |
| 2008/0317292 A1 | 12/2008 | Baker et al. | |
| 2009/0099699 A1 | 4/2009 | Steinberg et al. | |
| 2009/0125151 A1 | 5/2009 | Steinberg et al. | |
| 2009/0171862 A1 | 7/2009 | Harrod et al. | |
| 2009/0254225 A1 | 10/2009 | Boucher et al. | |
| 2009/0259713 A1 | 10/2009 | Blumrich et al. | |
| 2010/0019051 A1 | 1/2010 | Rosen | |
| 2010/0025483 A1 | 2/2010 | Hoeynck et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0282857 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0015797 A1 | 1/2011 | Gilstrap | |
| 2011/0015798 A1 | 1/2011 | Golden et al. | |
| 2011/0015802 A1 | 1/2011 | Imes | |
| 2011/0022242 A1 | 1/2011 | Bukhin et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077896 A1 | 3/2011 | Steinberg et al. | |
| 2011/0106328 A1 | 5/2011 | Zhou et al. | |
| 2011/0166828 A1 | 7/2011 | Steinberg et al. | |
| 2011/0185895 A1 | 8/2011 | Freen | |
| 2011/0290893 A1 | 12/2011 | Steinberg | |
| 2011/0307103 A1 | 12/2011 | Cheung et al. | |
| 2012/0053745 A1 | 3/2012 | Ng | |
| 2012/0065783 A1 | 3/2012 | Fadell et al. | |
| 2012/0065935 A1 | 3/2012 | Steinberg et al. | |
| 2012/0085831 A1 | 4/2012 | Kopp | |
| 2012/0086562 A1 | 4/2012 | Steinberg | |
| 2012/0089523 A1 | 4/2012 | Hurri et al. | |
| 2012/0125559 A1 | 5/2012 | Fadell et al. | |
| 2012/0131504 A1 | 5/2012 | Fadell et al. | |
| 2012/0158350 A1 | 6/2012 | Steinberg et al. | |
| 2012/0221151 A1 | 8/2012 | Steinberg | |
| 2012/0259469 A1 | 10/2012 | Ward et al. | |
| 2013/0087629 A1 | 4/2013 | Stefanski et al. | |
| 2013/0103621 A1 | 4/2013 | Matsuoka et al. | |
| 2013/0151013 A1 | 6/2013 | Nikovski et al. | |

FOREIGN PATENT DOCUMENTS

| | | |
|---|---|---|
| JP | S5770344 A | 4/1982 |
| JP | 59106311 A | 6/1984 |
| JP | 01252850 A | 10/1989 |
| JP | H10-288376 A | 10/1998 |
| WO | 2010033563 A1 | 3/2010 |
| WO | 2011149600 A2 | 12/2011 |

(56) References Cited

FOREIGN PATENT DOCUMENTS

| WO | 2012024534 | A2 | 2/2012 |
|---|---|---|---|
| WO | 2012/068591 | A2 | 5/2012 |
| WO | 2012/092622 | A2 | 7/2012 |
| WO | 2014/172389 | A1 | 10/2014 |
| WO | 2012-092622 | A2 | 4/2017 |

OTHER PUBLICATIONS

International Preliminary Report on Patentability dated Oct. 29, 2015 for International Patent Application No. PCT/US2014/034244, all pages.
Office action dated Feb. 28, 2019 in Canadian Patent Application No. 2,909,588, all pages.
Office action dated Nov. 30, 2017 in Chinese Patent Application No. 201480029718.1, all pages.
Office action dated May 18, 2018 in Chinese Patent Application No. 201480029718.1, all pages.
Office action dated Jan. 3, 2018 in European Patent Application No. 14785485.5, all pages.
Office action dated Jul. 9, 2018 in European Patent Application No. 14785485.5, all pages.
Notice of Publication dated Aug. 18, 2016 in Japanese Patent Application No. 2016-509036, 1 page.
Office action dated May 9, 2018 in Japanese Patent Application No. 2016-509036, all pages.
Notice of Decision to Grant dated Jan. 29, 2019 in Japanese Patent Application No. 2016-509036, all pages.
Notice of Decision to Grant dated Nov. 9, 2018 in Chinese Patent Application No. 201480029718.1, all pages.
First Examination Report dated Jan. 21, 2019 in Australian Patent Application No. 2014254104, all pages.
Examiner Requisition dated Apr. 13, 2018 in Canadian application No. 2,909,588, all pages.
Henry C. Spindler and Leslie K. Norford, "Naturally ventilated and mixed-mode buildings—Part I: Thermal modeling", Building and Environment, vol. 44, No. 4, pp. 736-749, ISSN="0360-1323"; DOI="https://doi.org/10.1016/j.buildenv.2008.05.019"; URL="http://www.sciencedirect.com/science/article/pii/S0360132308001339", URL(Alternative )=https://pdf s. semanticscholar. org/ed77 /837f7 ee03d7fcd4 73e 7bc 7 c5fa38a1940e77.pdf, 2009.
Aprilaire Electronic Thermostats Model 8355 User's Manual, Research Products Corporation, 2000, 16 pages.
Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321 and TXH9421 Product Data, Honeywell International, Inc., 68-0311, No Date Given, 126 pages.
Honeywell Prestige THX9321-9421 Operating Manual, Honeywell International, Inc., 2011, 120 pages.
Hunter Internet Thermostat Installation Guide, Hunter Fan Co., 2012, 8 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owners Guide, Lennox Industries, Inc., 2007, 32 pages.
Lennox ComfortSense 7000 Owners Guide, Lennox Industries, Inc., 2009, 15 pages.
Lennox iComfort Manual, Lennox Industries, Inc., 2010, 20 pages.
Lux PSPU732T Manual, LUX Products Corporation, No Date Given, 48 pages.
NetX RP32-WIFI Network Thermostat Consumer Brochure, Network Thermostat, No Date Given, 2 pages.
NetX RP32-WIFI Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900Manual, Venstar, Inc., 2008, 113 pages.
Venstar T5800Manual, Venstar, Inc., No Date Given, 63 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc. Operating Manual, 2012, 48 pages.
White Rodgers (Emerson) Model 1F81-261 Installation and Operating Instructions, White Rodgers, No Date Given, 63 pages.
White Rodgers (Emerson) Model IF98EZ-1621 Homeowner's User Guide, White Rodgers, No Date Given, 28 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.
Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Auslander et al., "UC Berkeley DR Research Energy Management Group", PowerPoint Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
De Almeida et al., "Advanced Monitoring Technologies for the Evaluation of Demand-Side Management Programs", Energy, vol. 19, No. 6, 1994, pp. 661-678.

(56) References Cited

OTHER PUBLICATIONS

Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.

Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.

Gevorkian, "Alternative Energy Systems in Building Design", 2009, pp. 195-200.

Hoffman et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.

Levy, "A Vision of Demand Response—2016", The Electricity Journal, vol. 19, Issue 8, Oct. 2006, pp. 12-23.

Loisos et al., "Buildings End-Use Energy Efficiency: Alternatives to Compressor Cooling", California Energy Commission, Public Interest Energy Research, Jan. 2000, 80 pages.

Lopes, "Case Studies in Advanced Thermostat Control for Demand Response", AEIC Load Research Conference, St. Louis, MO, Jul. 2004, 36 pages.

Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.

Martinez, "SCE Energy$mart Thermostat Program", Advanced Load Control Alliance, Oct. 5, 2004, 20 pages.

Matty, "Advanced Energy Management for Home Use", IEEE Transaction on Consumer Electronics, vol. 35, No. 3, Aug. 1989, pp. 584-588.

Motegi et al., "Introduction to Commercial Building Control Strategies and Techniques for Demand Response", Demand Response Research Center, May 22, 2007, 35 pages.

Mozer, "The Neural Network House: An Environmental that Adapts to it's Inhabitants", AAAI Technical Report SS-98-02, 1998, pp. 110-114.

Mozer, M. et al., "The Neurothermostat: Predictive Optimal Control of Residential Heating Systems" appearing in M. Mozer et al. *Adv. in Neural Info. Proc. Systems 9*, Cambridge, MA: MIT Press. 1997, pp. 953-959.

Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.

Peffer et al., "Smart Comfort at Home: Design of a Residential Thermostat to Achieve Thermal Comfort, and Save Money and Peak Energy", University of California Berkeley, Mar. 2007, 1 page.

Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.

International Search Report and Written Opinion dated Aug. 29, 2014 for PCT/US2014/034244 filed on Apr. 15, 2014, 10 pages.

Honeywell THX9321 Prestige 2.0 and TXH9421 Prestige IAQ 2.0 with EIM Product Data, Honeywell International, Inc., 68-0311, Jan. 2012, 126 pages.

Lux PSPU732T Manual, LUX Products Corporation, Jan. 6, 2009, 48 pages.

NetX RP32-WIFI Network Thermostat Consumer Brochure, Network Thermostat, May, 2011, 2 pages.

Venstar T5800 Manual, Venstar, Inc., Sep. 7, 2011, 63 pages.

White Rodgers (Emerson) Model 1F81-261 Installation and Operating Instructions, White Rodgers, Apr. 15, 2010, 8 pages.

White Rodgers (Emerson) Model IF98EZ-1621 Homeowner's User Guide, White Rodgers, Jan. 25, 2012, 28 pages.

Notification of Publication of Patent Application for Invention and Entering the Substantive Examination Proceeding dated Apr. 7, 2016, for Chinese Application No. 201480029718.1, 44 pages, English Translation.

EP Patent Application No. 14785485.5 filed Apr. 15, 2014 Extended European Search Report dated Nov. 3, 2016, all pages.

CN Patent Application No. 201480029718.1 filed Apr. 15, 2014, Office Action dated Apr. 1, 2017, all pages.

\* cited by examiner

GENERATING AND IMPLEMENTING THERMODYNAMIC MODELS OF A STRUCTURE

CROSS-REFERENCE TO RELATED APPLICATIONS

This application is a continuation of U.S. Non-Provisional patent application Ser. No. 13/866,602, filed Apr. 19, 2013, which is hereby incorporated by reference herein in its entirety for all purposes.

FIELD

This patent specification relates to systems, apparatus, methods, and related computer program products for controlling heating, ventilation, and air conditioning (HVAC) systems. More particularly, this patent specification relates to techniques for generating and implementing thermodynamic models of a structure in the management of HVAC systems that control a thermal environment of that structure.

BACKGROUND

To manage a thermal environment of a structure such as a residential or commercial building, one or more HVAC control systems are typically used. HVAC control systems need to make decisions as to how to condition the enclosure appropriately, which may include varying an internal heat, humidity, or other environmental characteristic. Since the enclosure has an associated thermal mass that needs to be heated or cooled, how and when the heating or cooling is carried out can greatly impact the energy efficiency as well as the cost of the process.

Conventionally, a model that attempts to specify how a structure will behave under the influence of an HVAC system is created based on a variety of factors such as structure size, number and characteristics of windows included in the structure, etc. That model is then used to specify the type and size of HVAC system to install and/or it is used by the HVAC control system throughout the lifetime of the building. For example, U.S. Pat. No. 7,072,727 discusses a method for determining heat loss of a building and for the proper sizing of HVAC equipment for the building.

It is also known for model updates to occur after installation through simple calculations such as adding heat and measuring time and temperature. For example, U.S. Pat. No. 5,555,927 discusses an adapted recovery method for a setback thermostat using the intersection of the space temperature with a sloped recovery temperature line which approximates the change in temperature as a function of time during recovery of the temperature controlled space from the setback temperature, to determine the time at which recovery to the occupancy temperature should begin. The recovery line slope is re-calculated and updated.

U.S. Patent Application Publication No. 2005/0192915 discusses a system for forecasting predicted thermal loads for a building including a neural-network-based thermal load predictor. The neural network can be trained using building data, occupancy data and actual weather conditions. A thermal condition forecaster uses a simple regression model based on forecasted high and low temperatures for a specific locale and measured local temperature and humidity observations made immediately prior to the prediction.

While such systems have evolved the technological field of HVAC control based on thermodynamic models of a structure, there remains significant room for improving the accuracy of the thermodynamic models in characterizing changes to a thermal environment of a structure over time as a result of actuation of an associated HVAC system.

BRIEF SUMMARY

Various methods for generating a thermodynamic model of a structure associated with an HVAC system are disclosed. According to one embodiment, a method for generating a thermodynamic model includes a variety of operations. Such operations include receiving a request for a thermodynamic model of a structure that predicts an indoor temperature trajectory of the structure in response to application of an HVAC actuation state, acquiring time information, temperature information, and HVAC actuation state information for a period of time during which the HVAC system controls a thermal environment of the structure, and determining a plurality of weighting factors corresponding to a respective plurality of predetermined basis functions, the weighted combination of basis functions characterizing an indoor temperature trajectory of the structure in response to a change in the HVAC actuation state, the basis functions including an inertial carryover component that characterizes a carryover of a rate of indoor temperature change that was occurring immediately prior to the change in actuation state. The operations may further include, in response to the request, returning a thermodynamic model including the determined plurality of weighting factors corresponding to the respective plurality of predetermined basis functions In some embodiments, the basis functions may include one or more of a variety of functions, such as a difference in outdoor temperature and indoor temperature, a difference in structural temperature and indoor temperature, a representation of the time of day, a constant representative of energy changes not affected by environmental factors, and/or a current stage effect component that characterizes an effect that a current stage has on the indoor temperature trajectory of the structure.

A variety of thermostats are also disclosed. According to some embodiments, an intelligent network-connected thermostat for controlling an operation of an HVAC system in a smart home environment is disclosed. The thermostat may include a variety of components. For example, the thermostat may include HVAC control circuitry operable to actuate one or more elements of the HVAC system, and one or more sensors for measuring characteristics of the smart home environment. The thermostat may also include a processor coupled to the HVAC control circuitry and the one or more sensors, which may be operable to cause the thermostat to perform a variety of operations. Such operations may include, for example, receiving a request for a thermodynamic model of a structure that predicts an indoor temperature trajectory of the structure in response to application of an HVAC actuation state, acquiring time information, temperature information, and HVAC actuation state information for a period of time during which the HVAC system controls a thermal environment of the structure, and determining a plurality of weighting factors corresponding to a respective plurality of predetermined basis functions, the weighted combination of basis functions characterizing an indoor temperature trajectory of the structure in response to a change in the HVAC actuation state, the basis functions including an inertial carryover component that characterizes a carryover of a rate of indoor temperature change that was occurring immediately prior to the change in actuation state. Such operations may further include, in response to the request, returning a thermodynamic model including the determined plurality of weighting factors corresponding to the respective plurality of predetermined basis functions.

In some embodiments, the plurality of weighting factors may be determined using only information that is available local to the thermostat except for an externally provided weather forecast and an externally provided clock signal. In some embodiments, the HVAC actuation state includes a first state of relatively high energy consumption and a second state of relatively low energy consumption. In some embodiments, each basis function may characterize a portion of the indoor temperature trajectory.

Computer-readable storage mediums are also disclosed. According to some embodiments, a tangible non-transitory computer-readable storage medium including instructions that, when executed by a computer processor, cause the computer processor to perform operations is disclosed. Such operations may include receiving a request for a thermodynamic model of a structure that predicts an indoor temperature trajectory of the structure in response to application of an HVAC actuation state, acquiring time information, temperature information, and HVAC actuation state information for a period of time during which the HVAC system controls a thermal environment of the structure, and determining a plurality of weighting factors corresponding to a respective plurality of predetermined basis functions, the weighted combination of basis functions characterizing an indoor temperature trajectory of the structure in response to a change in the HVAC actuation state, the basis functions including an inertial carryover component that characterizes a carryover of a rate of indoor temperature change that was occurring immediately prior to the change in actuation state. Such operations may further include, in response to the request, returning a thermodynamic model including the determined plurality of weighting factors corresponding to the respective plurality of predetermined basis functions.

In some embodiments, the request for the thermodynamic model may indicate a level of specificity desired for a returned thermodynamic model, and the instructions may cause the computer processor to perform additional operations. Such additional operations may include searching a plurality of existing models for one or more candidate models are sufficient to satisfy the request for the thermodynamic model. When the search fails to locate any candidate models, a new model may be generated and, in response to the request, returned. When the search locates only one candidate model, the located model may be returned in response to the request. When the search locates a plurality of candidate models, a most restrictive one of the plurality of candidate models may be returned in response to the request.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Various methods, apparatus, systems, and computer-readable mediums are described herein that concern the field of thermodynamic behavioral modeling of structures. In many modern systems, including systems such include HVAC systems which manage the environmental characteristics in a structure, it is desirable to predict the thermodynamic behavior of a structure. Such predictions may have a variety of tangible, beneficial uses. In modern HVAC control systems, such predictions may be used on a daily basis to accurately actuate the HVAC system in reaching or maintaining desired setpoint temperatures. Such predictions may also be used periodically, such as during demand-response (DR) events, to more accurately identify a schedule of setpoint temperatures that maximizes the amount of energy shifted from the DR event period to a period of time outside of the DR event period, or a schedule that is optimal in some additional or alternative sense.

Regardless of the specific application in which predictions of thermodynamic behavior are implemented, such predictions in many embodiments are facilitated by the use of a thermodynamic model of the structure. The thermodynamic model itself may be defined by one or more basis functions that characterize a trajectory of an environmental condition associated with the structure, such as indoor temperature, in response to application of a stimulus, such as a change in HVAC actuation state. In generating the model, weighting factors for each of the basis functions may be fit to a history of data indicative of past environmental condition trajectories that resulted from past changes in HVAC actuation states. Once the model has been generated, it may subsequently be used to simulate the thermodynamic behavior of the structure.

It should be recognized that the term "thermodynamic" may include all state variables that can be used to characterize a physical system. Examples of thermodynamic variables include, but are not limited to: pressure, temperature, airflow, humidity, and particulate matter. Further, the term "model" refers generally to a description or representation of a system. The description or representation can use mathematical language, such as in the case of mathematical models. Examples of types of models and/or characteristics of models, without limitation, include: lookup tables, linear, non-linear, deterministic, probabilistic, static, dynamic, and models having lumped parameters and/or distributed parameters.

Figure 1A:
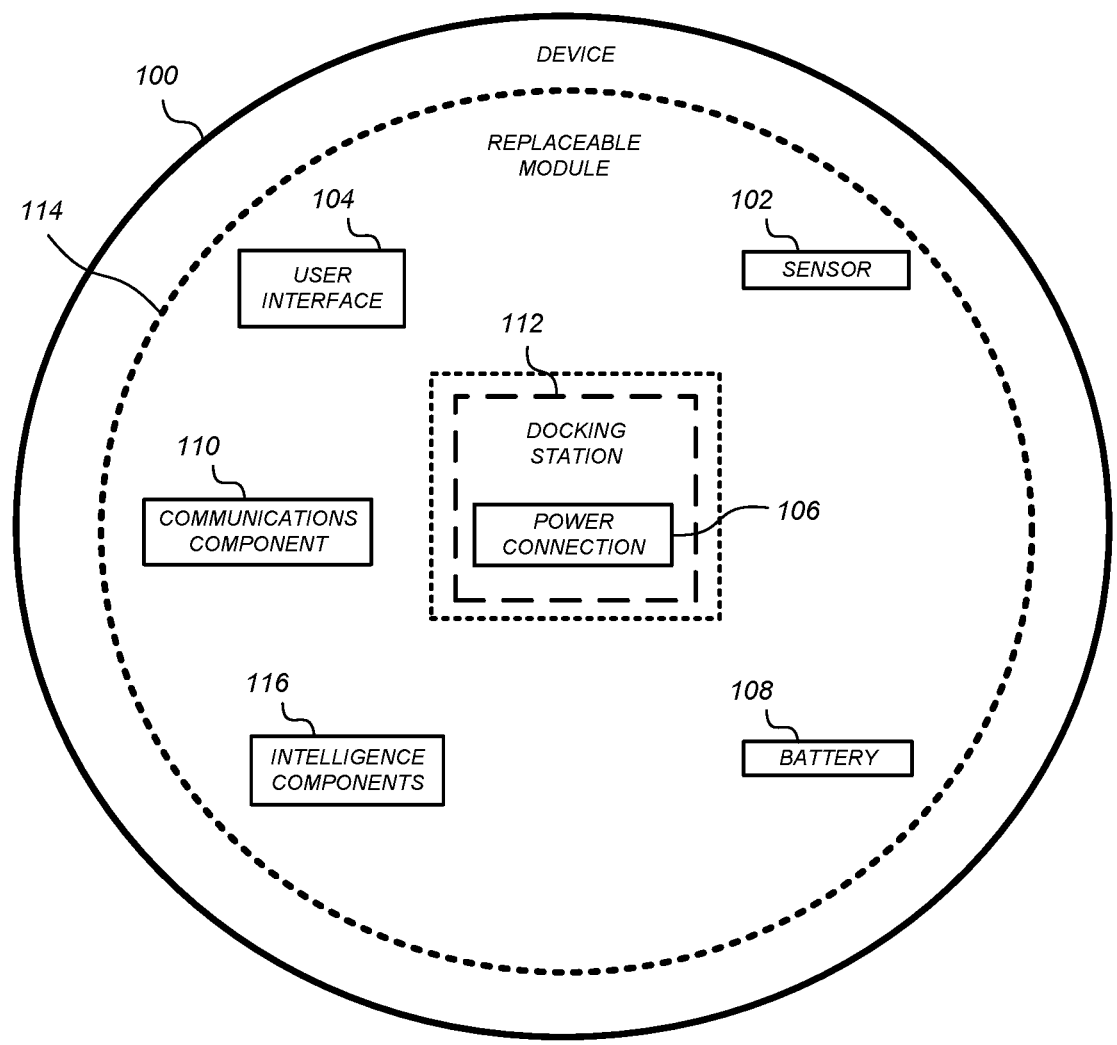
FIG. 1A illustrates an example of general device components which can be included in an intelligent, network-connected device that may be used to implement one or more of the thermodynamic behavior prediction processes described herein according to an embodiment.

Turning now to the figures, FIG. 1A illustrates an example of general device components which can be included in an intelligent, network-connected device 100 (i.e., "device") that may be used to implement one or more of the thermodynamic behavior prediction processes described herein according to an embodiment. Each of one, more or all devices 100 within a system of devices can include one or more sensors 102, a user-interface component 104, a power supply (e.g., including a power connection 106 and/or battery 108), a communications component 110, a modularity unit (e.g., including a docking station 112 and replaceable module 114) and intelligence components 116. Particular sensors 102, user-interface components 104, power-supply configurations, communications components 110, modularity units and/or intelligence components 116 can be the same or similar across devices 100 or can vary depending on device type or model.

Sensors 102 as described herein generally includes devices or systems that measure and/or register a substance, physical phenomenon and/or physical quantity. The sensor may convert a measurement into a signal, which can be interpreted by an observer, instrument and/or system. A sensor can be implemented as a special purpose device and/or can be implemented as software running on a general-purpose computer system. By way of example and not by way of limitation, one or more sensors 102 in a device 100 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 102 can include temperature sensor(s), humidity sensor(s), hazard-related sensor(s) or other environmental sensor(s), accelerometer(s), microphone(s), optical sensor(s) up to and including camera(s) (e.g., charged-coupled-device or video cameras), active or passive radiation sensor(s), GPS receiver(s) or radio-frequency identification detector(s). While FIG. 1A illustrates an embodiment with a single sensor, many embodiments will include multiple sensors. In some instances, device 100 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 104 in device 100 may be configured to present information to a user via a visual display (e.g., a thin-film-transistor display or organic light-emitting-diode display) and/or an audio speaker and/or some other communication medium. User-interface component 104 can also include one or more user-input components to receive information from a user, such as a touchscreen, buttons, scroll component (e.g., a movable or virtual ring component), microphone or camera (e.g., to detect gestures). In one embodiment, user-input component 104 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 104 includes a camera, such that gestures can be detected (e.g., to indicate that a power or alarm state of a device is to be changed).

A power-supply component in device 100 may include a power connection 106 and/or local battery 108. For example, power connection 106 can connect device 100 to a power source such as a line voltage source. In some instances, connection 106 to an AC power source can be used to repeatedly charge a (e.g., rechargeable) local battery 108, such that battery 108 can later be used to supply power if needed in the event of an AC power disconnection or other power deficiency scenario.

A communications component 110 in device 100 can include a component that enables device 100 to communicate with a central server or a remote device, such as another device described herein or a portable user device. Communications component 110 can allow device 100 to communicate via, e.g., Wi-Fi, ZigBee, 3G/4G wireless, CAT6 wired Ethernet, HomePlug or other powerline communications method, telephone, or optical fiber, by way of non-limiting examples. Communications component 110 can include a wireless card, an Ethernet plug, or another transceiver connection. In some embodiments, the communications component 110 facilitates communication with a central server to synchronize information between device 100, the central server, and in some cases additional devices. Techniques for synchronizating data between such devices are further described in the commonly assigned U.S. Ser. No. 13/624,892, filed Sep. 22, 2012, the contents of which are incorporated by reference herein in their entirety for all purposes.

A modularity unit in device 100 can include a static physical connection, and a replaceable module 114. Thus, the modularity unit can provide the capability to upgrade replaceable module 114 without completely reinstalling device 100 (e.g., to preserve wiring). The static physical connection can include a docking station 112 (which may also be termed an interface box) that can attach to a building structure. For example, docking station 112 could be mounted to a wall via screws or stuck onto a ceiling via adhesive. Docking station 112 can, in some instances, extend through part of the building structure. For example, docking station 112 can connect to wiring (e.g., to 120V line voltage wires) behind the wall via a hole made through a wall's sheetrock. Docking station 112 can include circuitry such as power-connection circuitry 106 and/or AC-to-DC powering circuitry and can prevent the user from being exposed to high-voltage wires. Docking station 112 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 112 are specific to a type or model of device, such that, e.g., a thermostat device includes a different docking station than a smoke detector device. In some instances, docking stations 112 can be shared across multiple types and/or models of devices 100.

Replaceable module 114 of the modularity unit can include some or all sensors 102, processors, user-interface components 104, batteries 108, communications components 110, intelligence components 116 and so forth of the device. Replaceable module 114 can be configured to attach to (e.g., plug into or connect to) docking station 112. In some instances, a set of replaceable modules 114 are produced with the capabilities, hardware and/or software, varying across the replaceable modules 114. Users can therefore easily upgrade or replace their replaceable module 114 without having to replace all device components or to completely reinstall device 100. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 116 of the device can support one or more of a variety of different device functionalities. Intelligence components 116 generally include one or more processors configured and programmed to carry out and/or cause to be carried out one or more of the advantageous functionalities described herein. The intelligence components 116 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 116 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 116 can be configured to detect when a location (e.g., a house or room) is occupied, up to and including whether it is occupied by a specific person or is occupied by a specific number and/or set of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 116 may include image-recognition technology to identify particular occupants or objects.

In some instances, intelligence components 116 can be configured to predict desirable settings and/or to implement those settings. For example, based on the presence detection, intelligence components 116 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 116 can initiate an audio or visual indicator of where the person, animal or object is or can initiate an alarm or security feature if an unrecognized person is detected under certain conditions (e.g., at night or when lights are out). As yet another example, intelligence components 116 can detect hourly, weekly or even seasonal trends in user settings and adjust settings accordingly. For example, intelligence components 116 can detect that a particular device is turned on every week day at 6:30 am, or that a device setting is gradually adjusted from a high setting to lower settings over the last three hours. Intelligence components 116 can then predict that the device is to be turned on every week day at 6:30 am or that the setting should continue to gradually lower its setting over a longer time period.

In some instances, devices can interact with each other such that events detected by a first device influence actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 1B:
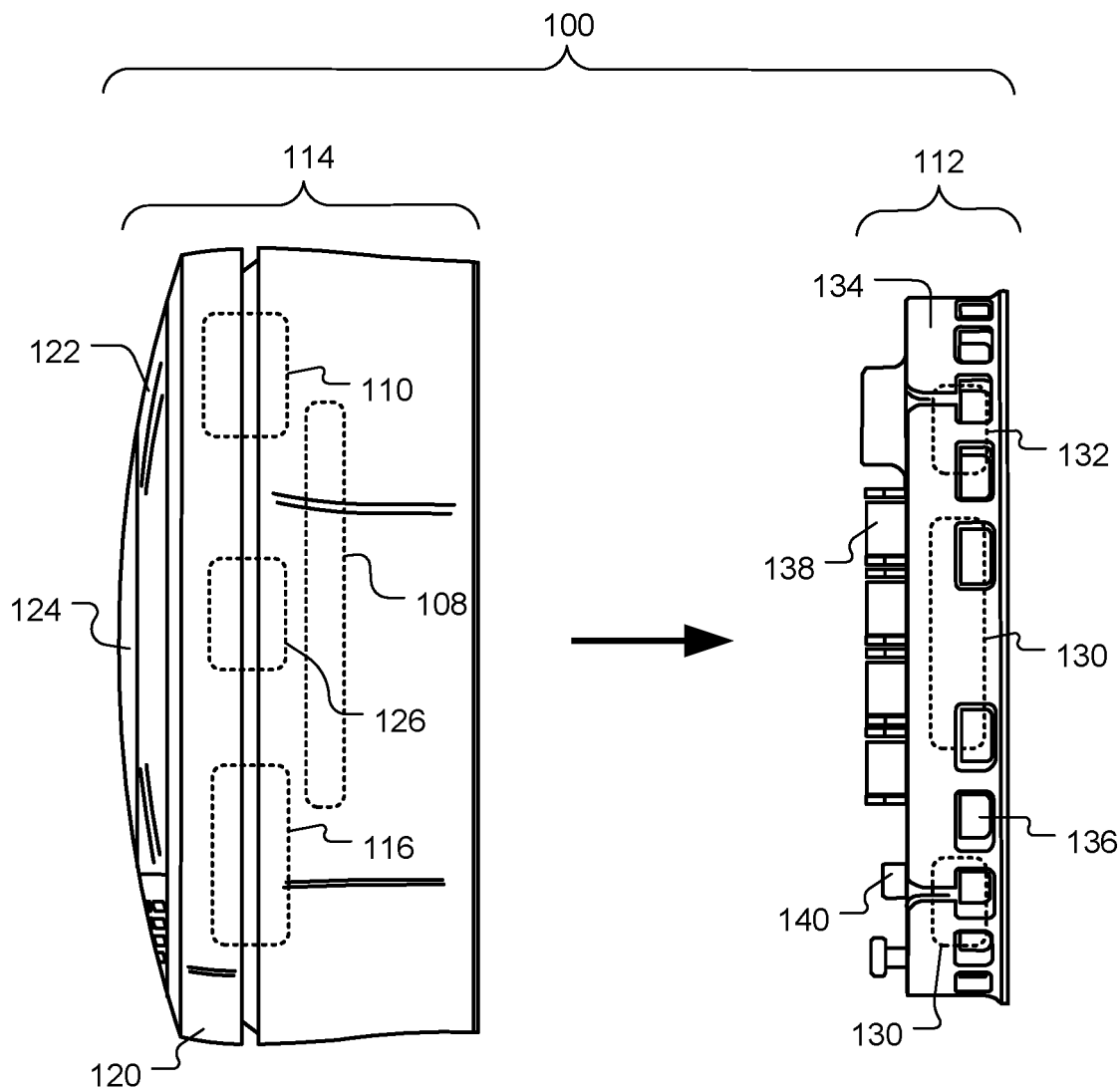
FIG. 1B illustrates an intelligent, network-connected device having a replaceable module and a docking station for ease of installation, configuration, and upgrading according to an embodiment.

FIG. 1B illustrates an intelligent, network-connected device 100 having a replaceable module 114 (e.g., a head unit) and a docking station 112 (e.g., a back plate) for ease of installation, configuration, and upgrading according to an embodiment. As is described hereinabove, device 100 may be wall mounted, have a circular shape, and have an outer rotatable ring 120 (that may be, e.g., part of user interface 104) for receiving user input. Outer rotatable ring 120 allows the user to make adjustments, such as selecting a new target temperature. For example, by rotating outer ring 120 clockwise, a target setpoint temperature can be increased, and by rotating the outer ring 120 counter-clockwise, the target setpoint temperature can be decreased. Changes to an existing setpoint temperature that reflect a desire for the temperature in the structure to be immediately changed to that setpoint temperature may herein be referred to as changes to an "immediate setpoint temperature" or a "current setpoint temperature". This is in contrast to setpoint temperatures that may be provided in a hourly, daily, weekly, monthly, or other schedule in which setpoint temperatures may reflect a desire for future temperatures in the structure. Such setpoint temperatures may herein be referred as "scheduled setpoint temperature" or as a "schedule of setpoint temperatures".

Device 100 has a cover 122 that includes a display 124 (that may be, e.g., part of user interface 104). Head unit 114 slides onto back plate 112. Display 124 may display a variety of information depending on, e.g., a current operational state of the device 100, direct user interaction with the device via ring 120, sensed presence of the user via, e.g., a proximity sensor 102 (such as a passive infrared motion sensor), remote user interaction with the device via a remote access device, etc. For example, display 124 may display central numerals that are representative of a current setpoint temperature.

According to some embodiments the connection of the head unit 114 to back plate 112 can be accomplished using magnets, bayonet, latches and catches, tabs or ribs with matching indentations, or simply friction on mating portions of the head unit 114 and back plate 112. According to some embodiments, the head unit 114 includes battery 108, communications component 110, intelligence components 116, and a display driver 126 (that may be, e.g., part of user interface 104). Battery 108 may be recharged using recharging circuitry (that may be, e.g., part of intelligence components 116 and/or may be included in the back plate 112) that uses power from the back plate 112 that is either obtained via power harvesting (also referred to as power stealing and/or power sharing) from the HVAC system control circuit(s) or from a common wire, if available, as described in further detail in commonly assigned co-pending U.S. Ser. No. 13/034,674 and Ser. No. 13/034,678, both filed Feb. 24, 2011, and commonly assigned U.S. Ser. No. 13/267,871, filed Oct. 6, 2011, all of which are incorporated by reference herein in their entirety for all purposes. According to some embodiments, battery 108 is a rechargeable single cell lithium-ion, or a lithium-polymer battery.

Back plate 112 includes electronics 130 and a temperature sensor 132 (that may be, e.g., one of sensors 102) in housing 134, which are ventilated via vents 136. Temperature sensor 132 allows the back plate 112 to operate as a fully functional thermostat even when not connected to the head unit 114. Wire connectors 138 are provided to allow for connection to HVAC system wires, such as connection to wires for actuating components of the HVAC system, wires for receiving power from the HVAC system, etc. Connection terminal 140 is a male or female plug connector that provides electrical connections between the head unit 114 and back plate 112. Various arrangements for connecting to and controlling an HVAC system are further described in U.S. Ser. Nos. 13/034,674 and 13/034,678, supra.

In some embodiments, the back plate electronics 130 includes an MCU processor, and driver circuitry for opening and closing the HVAC control circuits, thereby turning on and turning off the one or more HVAC functions such as heating and cooling. The electronics 130 also includes flash memory which is used to store a series of programmed settings that take effect at different times of the day, such that programmed setpoint (i.e., desired temperature) changes can be carried out even when the head unit 114 is not attached to the back plate 112. According to some embodiments, the electronics 130 also includes power harvesting circuitry (that may be in addition or alternatively to that provided in head unit 114) to obtain power from the HVAC control circuit(s) even when an HVAC common power wire is not available.

Device 100 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 1A and 1B. Thus, the depiction of device 100 in FIGS. 1A and 1B should be taken as being illustrative in nature, and not limiting to the scope of the present teachings.

Figure 2:
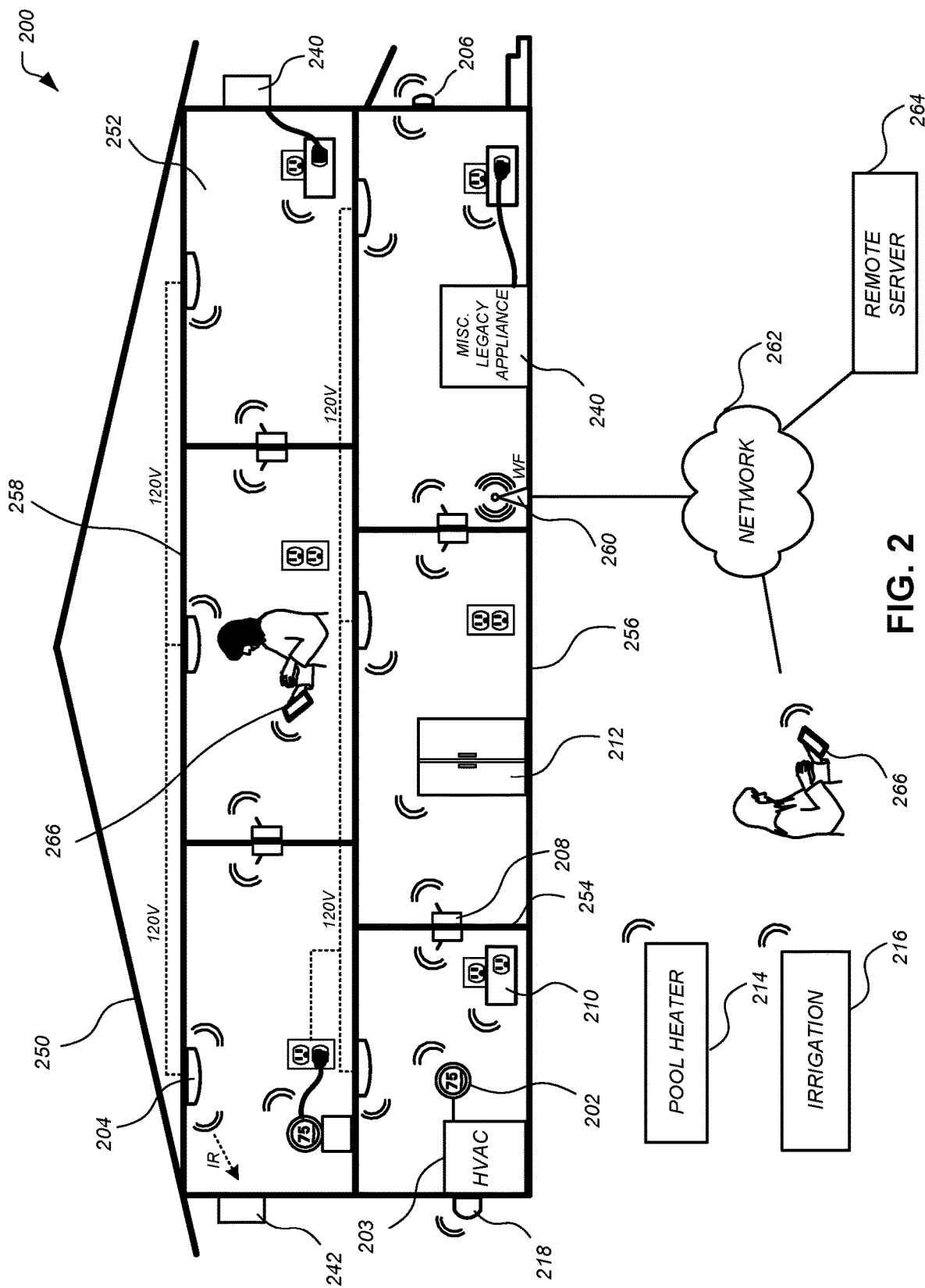
FIG. 2 illustrates an example of a smart home environment within which one or more of the devices, methods, systems, services, and/or computer program products described further herein can be applicable according to an embodiment.

FIG. 2 illustrates an example of a smart home environment 200 within which one or more of the devices, methods, systems, services, and/or computer program products described further herein can be applicable according to an embodiment. The depicted smart home environment includes a structure 250, which can include, e.g., a house, office building, garage, mobile home, or other type of enclosure for which thermodynamic behavior may be predicted. It will be appreciated that devices can also be integrated into a smart home environment that does not include an entire structure 250, such as an apartment, condominium, or office space. Further, the smart home environment can control and/or be coupled to devices outside of the actual structure 250. Indeed, several devices in the smart home environment need not physically be within the structure 250 at all. For example, a device controlling a pool heater or irrigation system can be located outside of the structure 250.

The smart home environment 200 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258. The various devices that may be incorporated within the smart home environment 200 include intelligent, multi-sensing, network-connected devices that can integrate seamlessly with each other and/or with cloud-based server systems to provide any of a variety of useful smart home objectives. An intelligent, multi-sensing, network-connected thermostat 202 can detect ambient climate characteristics (e.g., temperature and/or humidity) and control a heating, ventilation and air-conditioning (HVAC) system 203. It should be recognized that while control of an HVAC system is described herein, similar principles can equally be applied to controlling other temperature/humidity control systems, such as a heating system, an air conditioning system, a humidity control system, or any combination thereof. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

In some embodiments, the smart home may include at least one energy consumption meter 218 such as a smart meter. The energy consumption meter 218 monitors some or all energy (electricity, gas, etc.) consumed by the devices in and around the structure 250. The energy consumption meter 218 may display the amount of energy consumed over a given period of time on a surface of the meter 218. The given period may be, e.g., a second, a minute, an hour, a day, a month, a time span less than one second, a time span greater than a month, or a time span between one second and one month. In some embodiments, the energy consumption meter 218 may include communication capabilities (wired or wireless) that enable the meter 218 to communicate various information, e.g., the amount of energy consumed over one or more given periods, the price of energy at any particular time or during any particular period of time, etc. The communication capabilities may also enable the meter to receive various information. For example, the meter may receive instructions for controlling one or more devices in the smart home such as the HVAC system 203, the price of energy at any particular time or during any particular period of time, etc. To facilitate control of devices in and around the structure 250, the meter 218 may be wired or wirelessly connected to such devices.

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 200 can be capable of data communications and information sharing with any other devices within the smart home environment 200, as well as to any devices outside the smart home environment 240 such as the access device 266 and/or remote server 264. The devices can send and receive communications via any of a variety of custom or standard wireless protocols (Wi-Fi, ZigBee, 6LoWPAN, IR, IEEE 802.11, IEEE 802.15.4, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that are not plugged into AC outlets.

For example, a first device can communicate with a second device via a wireless router 260. A device can further communicate with remote devices via a connection to a network, such as the network 262. Through the network 262, the device can communicate with a central (i.e., remote) server or a cloud-computing system 264. The remote server or cloud-computing system 264 can be associated with a manufacturer, support entity or service provider associated with the device. In one embodiment, a user may be able to contact customer support using a device itself rather than needing to use other communication means such as a telephone or Internet-connected computer.

Devices' network connections can further allow a user to interact with the device even if the user is not proximate to the device. For example, a user can communicate with a device (e.g., thermostat 202) using a computer (e.g., a desktop computer, laptop computer, or tablet) or other portable electronic device (e.g., a smartphone) 266. A webpage or app can be configured to receive communications from the user and control the device based on the communications and/or to present information about the device's operation to the user. For example, when the portable electronic device 266 is being used to interact with the thermostat 202, the user can view a current setpoint temperature for a thermostat and adjust it using the portable electronic device 266. The user can be in the structure during this remote communication or outside the structure. The communications between the portable electronic device 266 and the thermostat 202 may be routed via the remote server 264 (e.g., when the portable electronic device 266 is remote from structure 250) or, in some embodiments, may be routed exclusive of the remote server 264.

The smart home environment 200 also can include a variety of non-communicating legacy appliances 240, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208 or, in some embodiments, by using socket-based communication protocol such as powerline to communicate via a wall plug interface 210.

Smart home 200 in certain embodiments is an environment including a number of client devices and access devices all operable to communicate with one another as well as with devices or systems external to the smart home 200 such as remote server 264. However, it will be appreciated by those skilled in the art that such an environment could operate equally well having fewer or a greater number of components than are illustrated in FIG. 2. One particular example of a smart-home environment including various elements having differing functionality is described in detail in U.S. Provisional Ser. No. 61/704,437, filed Sep. 21, 2012, the entire contents of which are incorporated by reference herein in their entirety for all purposes. Thus, the depiction of the smart home environment 200 in FIG. 2 should be taken as being illustrative in nature, and not limiting to the scope of the present teachings.

Figure 3:
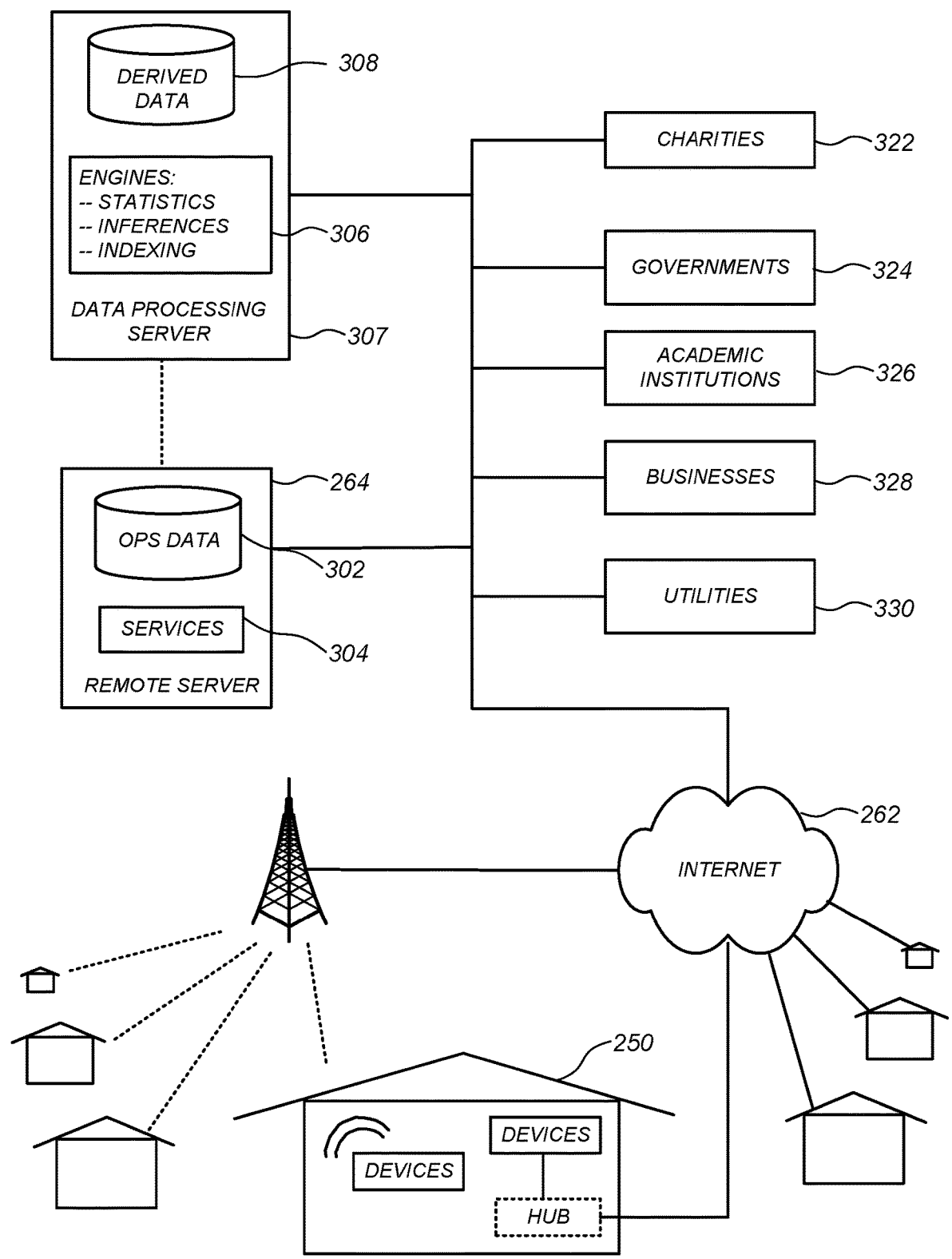
FIG. 3 illustrates a network-level view of an extensible devices and services platform with which the smart home of FIGS. 1 and/or 2 can be integrated according to an embodiment.

FIG. 3 illustrates a network-level view of an extensible devices and services platform with which the smart home of FIGS. 1 and/or 2 can be integrated according to an embodiment. Each of the intelligent, network-connected devices discussed with reference to FIG. 2 can communicate with one or more remote servers or cloud computing systems 264. The communication can be enabled by establishing connection to the Internet 262 either directly (for example, using 3G/4G connectivity to a wireless carrier), though a hubbed network (which can be a scheme ranging from a simple wireless router, for example, up to and including an intelligent, dedicated whole-home control node), or through any combination thereof.

The remote server or cloud-computing system 264 can collect operation data 302 from the smart home devices. For example, the devices can routinely transmit operation data or can transmit operation data in specific instances (e.g., when requesting customer support). The remote server or cloud-computing architecture 264 can further provide one or more services 304. The services 304 can include, e.g., software update, customer support, sensor data collection/logging, remote access, remote or distributed control, or use suggestions (e.g., based on collected operation data 304 to improve performance, reduce utility cost, etc.). Data associated with the services 304 can be stored at the remote server or cloud-computing system 264 and the remote server or cloud-computing system 264 can retrieve and transmit the data at an appropriate time (e.g., at regular intervals, upon receiving request from a user, etc.).

One salient feature of the described extensible devices and services platform, as illustrated in FIG. 3, is a processing engine 306, which can be concentrated at a single data processing server 307 (which may be included in or separate from remote server 264) or distributed among several different computing entities without limitation. Processing engine 306 can include engines configured to receive data from a set of devices (e.g., via the Internet or a hubbed network), to index the data, to analyze the data and/or to generate statistics based on the analysis or as part of the analysis. The analyzed data can be stored as derived data 308. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 262. In this manner, processing engine 306 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, the processing engine 306 can generate statistics about device usage across a population of devices and send the statistics to device users, service providers or other entities (e.g., that have requested or may have provided monetary compensation for the statistics). As specific illustrations, statistics can be transmitted to charities 322, governmental entities 324 (e.g., the Food and Drug Administration or the Environmental Protection Agency), academic institutions 326 (e.g., university researchers), businesses 328 (e.g., providing device warranties or service to related equipment), or utility companies 330. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 4:
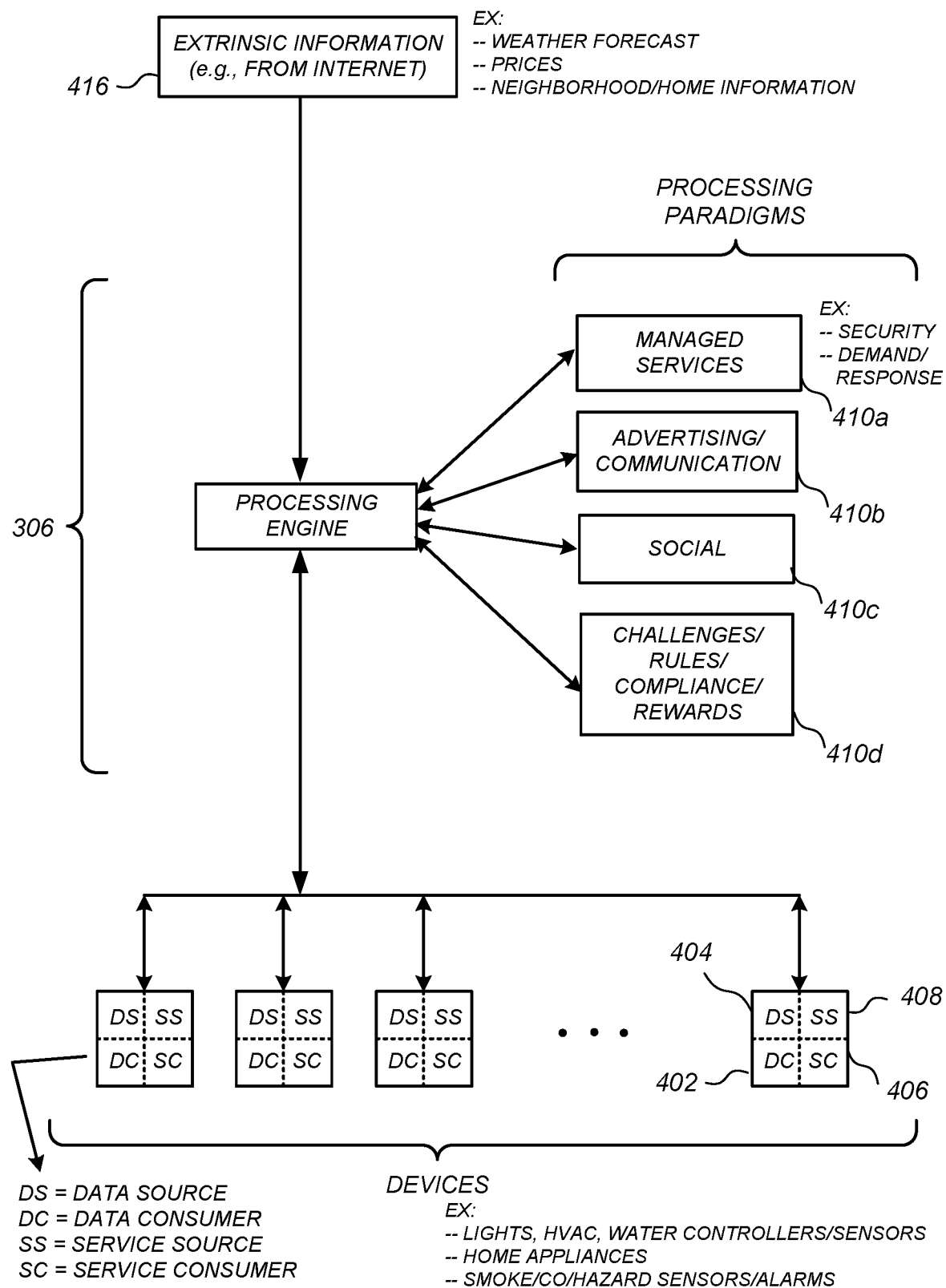
FIG. 4 illustrates an abstracted functional view of the extensible devices and services platform of FIG. 3 according to an embodiment.

FIG. 4 illustrates an abstracted functional view of the extensible devices and services platform of FIG. 3, with particular reference to the processing engine 306 as well as the devices of the smart home environment, according to an embodiment. Even though the devices situated in the smart home have an endless variety of different individual capabilities and limitations, they can all be thought of as sharing common characteristics in that each of them is a data consumer 402 (DC), a data source 404 (DS), a services consumer 406 (SC), and/or a services source 408 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 306 as including a number of paradigms 410. Processing engine 306 can include a managed services paradigm 410a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 306 can further include an advertising/communication paradigm 410b that estimates characteristics (e.g., demographic information), desires and/or products of interest of a user based on device usage. Services, promotions, products or upgrades can then be offered or automatically provided to the user. Processing engine 306 can further include a social paradigm 410c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 306 can include a challenges/rules/compliance/rewards paradigm 410d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 306 can integrate or otherwise utilize extrinsic information 416 from extrinsic sources to improve the functioning of one or more processing paradigms. Extrinsic information 416 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 306 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 5:
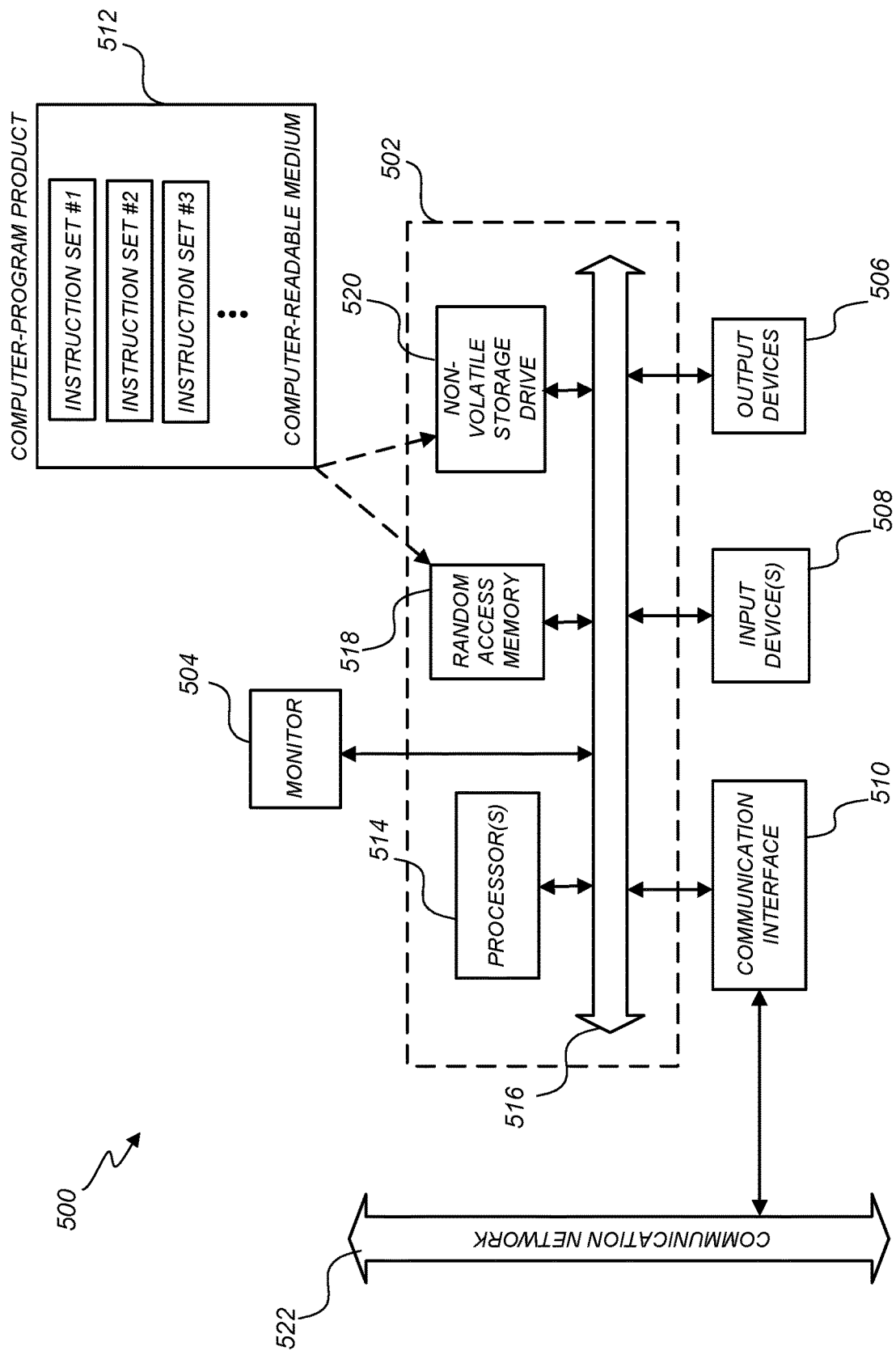
FIG. 5 is a block diagram of a special-purpose computer system according to an embodiment.

FIG. 5 is a block diagram of a special-purpose computer system 500 according to an embodiment. For example, one or more of client device 100, elements of smart home environment 200, remote server 264, processing engine 306, data processing server 307, or other electronic components described herein may be implemented as a special-purpose computer system 500. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 500 comprises a computer 502, a monitor 504 coupled to computer 502, one or more additional user output devices 506 (optional) coupled to computer 502, one or more user input devices 508 (e.g., keyboard, mouse, track ball, touch screen) coupled to computer 502, an optional communications interface 510 coupled to computer 502, and a computer-program product including a tangible computer-readable storage medium 512 in or accessible to computer 502. Instructions stored on computer-readable storage medium 512 may direct system 500 to perform the methods and processes described herein. Computer 502 may include one or more processors 514 that communicate with a number of peripheral devices via a bus subsystem 516. These peripheral devices may include user output device(s) 506, user input device(s) 508, communications interface 510, and a storage subsystem, such as random access memory (RAM) 518 and non-volatile storage drive 520 (e.g., disk drive, optical drive, solid state drive), which are forms of tangible computer-readable memory.

Computer-readable medium 512 may be loaded into random access memory 518, stored in non-volatile storage drive 520, or otherwise accessible to one or more components of computer 502. Each processor 514 may comprise a microprocessor, such as a microprocessor from Intel® or Advanced Micro Devices, Inc.®, or the like. To support computer-readable medium 512, the computer 502 runs an operating system that handles the communications between computer-readable medium 512 and the above-noted components, as well as the communications between the above-noted components in support of the computer-readable medium 512. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 508 include all possible types of devices and mechanisms to input information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 508 are typically embodied as a computer mouse, a trackball, a track pad, a joystick, wireless remote, a drawing tablet, a voice command system. User input devices 508 typically allow a user to select objects, icons, text and the like that appear on the monitor 504 via a command such as a click of a button or the like. User output devices 506 include all possible types of devices and mechanisms to output information from computer 502. These may include a display (e.g., monitor 504), printers, non-visual displays such as audio output devices, etc.

Communications interface 510 provides an interface to other communication networks and devices and may serve as an interface to receive data from and transmit data to other systems, WANs and/or the Internet, via a wired or wireless communication network 522. Embodiments of communications interface 510 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 510 may be coupled to a computer network, to a FireWire® bus, or the like. In other embodiments, communications interface 510 may be physically integrated on the motherboard of computer 502, and/or may be a software program, or the like.

RAM 518 and non-volatile storage drive 520 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 518 and non-volatile storage drive 520 may be configured to store the basic programming and data constructs that provide the functionality of various embodiments of the present invention, as described above.

Software instruction sets that provide the functionality of the present invention may be stored in computer-readable medium 512, RAM 518, and/or non-volatile storage drive 520. These instruction sets or code may be executed by the processor(s) 514. Computer-readable medium 512, RAM 518, and/or non-volatile storage drive 520 may also provide a repository to store data and data structures used in accordance with the present invention. RAM 518 and non-volatile storage drive 520 may include a number of memories including a main random access memory (RAM) to store of instructions and data during program execution and a read-only memory (ROM) in which fixed instructions are stored. RAM 518 and non-volatile storage drive 520 may include a file storage subsystem providing persistent (non-volatile) storage of program and/or data files. RAM 518 and non-volatile storage drive 520 may also include removable storage systems, such as removable flash memory.

Bus subsystem 516 provides a mechanism to allow the various components and subsystems of computer 502 communicate with each other as intended. Although bus subsystem 516 is shown schematically as a single bus, alternative embodiments of the bus subsystem may utilize multiple busses or communication paths within the computer 502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 6:
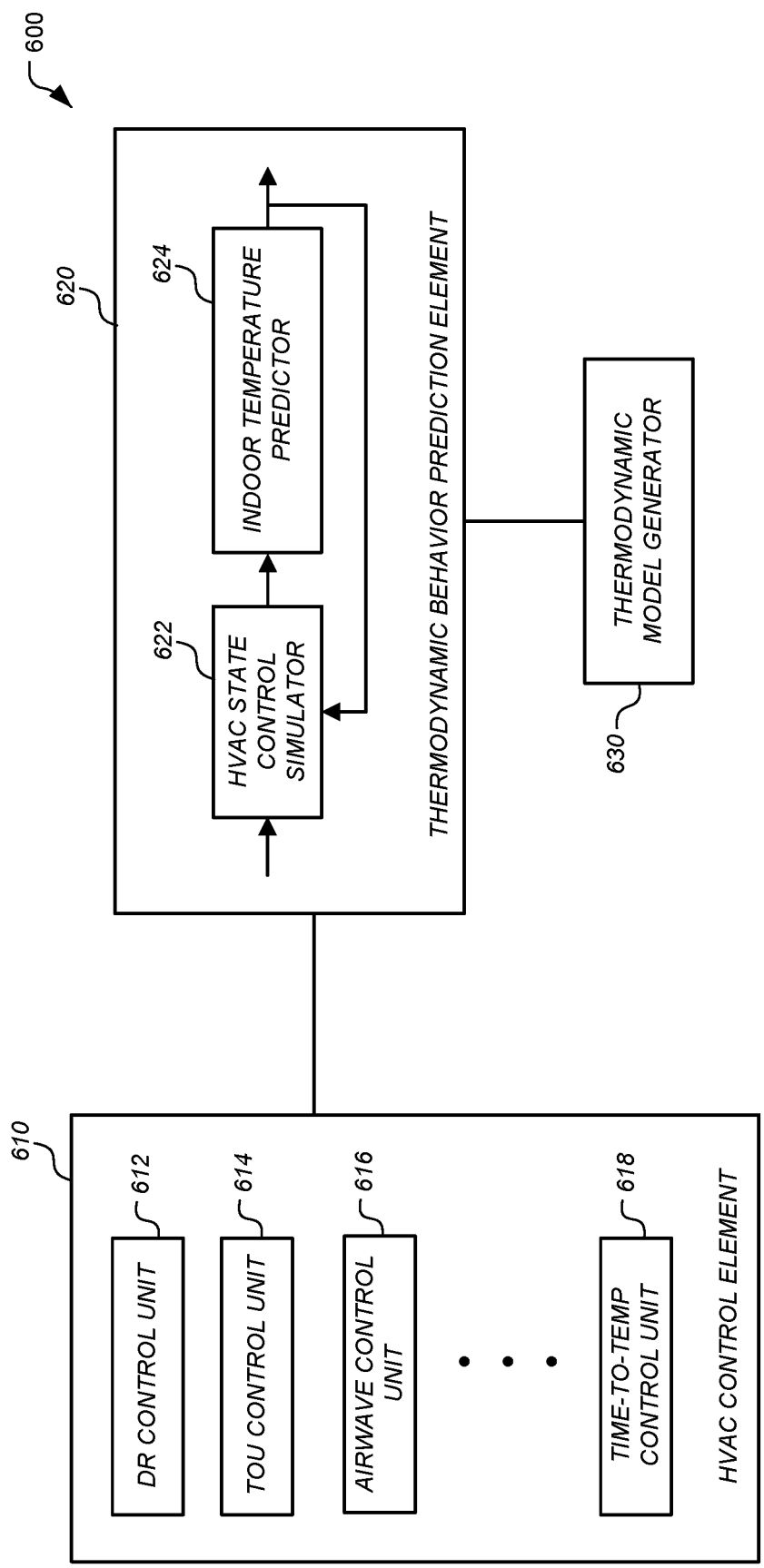
FIG. 6 illustrates components of an HVAC control system implementing thermodynamic behavioral modeling according to an embodiment.

FIG. 6 illustrates components of an HVAC control system 600 implementing thermodynamic behavioral modeling according to an embodiment. To facilitate understanding, the system 600 is described with reference to FIGS. 1A, 1B, 2, and 7, although it should be understood that embodiments of the system 600 are not limited to the exemplary apparatus and systems described with reference to FIGS. 1A, 1B, 2, and 7.

HVAC control system 600 according to various embodiments is operable to implement a variety of HVAC control algorithms for intelligently controlling the indoor environmental conditions of a structure via an HVAC system. One of more of the HVAC control algorithms may rely, either directly or indirectly, on thermodynamic predictions that predict the environmental response of a structure to changes in actuation state of an associated HVAC system. The thermodynamic predictions, in turn, may be generated based at least in part on a thermodynamic model of the structure, where the thermodynamic model characterizes an environmental characteristic trajectory of the structure in response to application of an HVAC actuation state. The characterized environmental characteristic trajectory may be a trajectory of one or more of a variety of environmental conditions internal to the structure, including but not limited to indoor temperature and indoor humidity.

HVAC control system 600 according to some embodiments includes a variety of components, such as an HVAC control element 610, a thermodynamic behavior prediction element 620, and a thermodynamic model generator 630. Each of these components may be physically, logically, or communicatively coupled to one another, and in some embodiments the structural elements and/or functionality thereof described herein for one or more components of system 600 may similarly be implemented in other components of system 600. Moreover, the components of system 600 can be implemented in hardware, software, or any combination thereof, and while in one embodiment the components of system 600 may be implemented in device 100, other embodiments are not so limited as either some or all of the components may be implemented in electronic devices (e.g., devices associated with smart home environment 200 such as portable electronic device 266 and/or remote server 264) other than device 100.

HVAC control element 610 includes HVAC control logic that, for one or more of a variety of reasons, may wish to obtain and use a prediction of the thermodynamic behavior of a structure. For example, one or more HVAC control algorithms implemented by thermostat 202 may rely on a prediction of the thermodynamic behavior of structure 250 to increase the accuracy of HVAC control. The HVAC element 610 may include HVAC control logic that spans a variety of possibilities, and may include and be implemented in, for example, a demand-response control unit 612, a time-of-use control unit 614, an airwave control unit 616, and a time-to-temperature control unit 618.

The DR control unit 612 may be operable to control the HVAC system, e.g., HVAC 203, for a DR event. DR control unit 612 may include various control logic for facilitating such control, and in some cases such control logic may control the HVAC system so as to shift energy consumption from within a DR event period (i.e., a period of time during which reduced energy consumption is desired) to one or more time periods outside of the DR event period. In performing such control, the DR control unit 612 may at least partially rely on or more predictions of the thermodynamic behavior of the structure. Various techniques for controlling an HVAC system in response to a DR event are described in commonly assigned U.S. Ser. No. 13/842,213, filed Mar. 15, 2013, and concurrently filed U.S. Ser. No. 13/866,635, both of which are incorporated by reference herein in their entirety for all purposes.

The time-of-use (TOU) control unit 614 may be operable to control the HVAC system in environments where there is a dynamic pricing of energy. That is, the price per unit of energy as seen by the consumer may vary over the course of the day. The TOU control unit in this case may include various control logic for facilitating control of the HVAC system so as to achieve desired levels of occupant comfort while efficiently consuming energy over the course of the day in accordance with the dynamic pricing. In performing such control, the TOU control unit 614 may at least partially rely on one or more predictions of the thermodynamic behavior of the structure. Various techniques for performing time-of-use HVAC system control are described in commonly assigned and concurrently filed U.S. Ser. No. 13/866,578, and commonly assigned and concurrently filed U.S. Ser. No. 13/866,635, both of which are incorporated by reference herein in their entirety for all purposes.

The airwave control unit 616 may be operable to independently control an air compressor and fan for an air conditioning element of the HVAC system. While cooling the internal temperature of a structure to reach a desired setpoint temperature, airwave control unit 616 may disengage or otherwise turn off the compressor prior to reaching the desired setpoint temperature, while keeping the fan on for a certain period of time. In such a case, energy consumption by the HVAC system may be reduced while still achieving desired setpoint temperatures. In performing such control, the airwave control unit 616 may at least partially rely on one or more predictions of the thermodynamic behavior of the structure. Various techniques for independently controlling an air compressor and fan for an air conditioning element of the HVAC system are described in commonly assigned U.S. Ser. No. 13/434,573, filed Mar. 29, 2012, which is incorporated by reference herein in its entirety for all purposes.

The time-to-temperature control unit 618 may be operable to calculate and, in some embodiments, communicate to the user, the amount of time needed for the HVAC system to cause the internal temperature of the structure to reach a desired setpoint temperature. The use of such calculations may not be limited to communication to the user, but could also be used by other HVAC control logic, and the control unit 618 may not be limited to determining the time needed to reach a desired temperature but could also include logic for determining the time needed to reach other indoor environmental characteristics, such as a particular humidity level. In determining the time needed to reach an indoor environmental characteristic, the time-to-temperature control unit 618 may at least partially rely on one or more predictions of the thermodynamic behavior the structure. Various techniques for performing time-to-temperature control are described in commonly assigned U.S. Ser. No. 12/984,602, filed Jan. 4, 2011, and U.S. Ser. No. 13/632,028, filed Sep. 30, 2012, both of which are incorporated by reference herein in their entirety for all purposes.

It should be recognized that embodiments are not limited to HVAC control element 610 including the specific control units described herein, but rather could include one or more of a variety of control units that rely, at least in part, on a prediction of the thermodynamic behavior of a structure. To facilitate acquiring information indicative of such a prediction, in some embodiments the HVAC control element 610, or one or more units included therein, may communicate to the thermodynamic behavior prediction element 620 a request for a prediction of the thermodynamic behavior of the structure over a prediction time period. In some specific embodiments, the request may include a request for an expected indoor temperature profile, an expected indoor humidity profile, or a profile characterizing one or more other expected indoor environmental characteristics. The request may include some, none, or all of a variety of information in support of the request. For example, the request may include a desired HVAC control trajectory that characterizes the desired control of the HVAC system over the prediction time period. The HVAC control trajectory in some embodiments may be, e.g., a schedule of setpoint temperatures for the prediction time period.

Thermodynamic behavior prediction element 620 includes computational logic that is operable to predict the thermodynamic behavior of a structure at least in part in response to a desired HVAC control trajectory. The thermodynamic behavior prediction element 620 may include a variety of computational logic for generating such predictions, such as an HVAC state control simulator 622 and an indoor temperature predictor 624.

The HVAC state control simulator 622 is operable to simulate actuation of one or more stages of an HVAC system based on a desired environmental condition (e.g., a desired indoor temperature) and a current environmental condition (e.g., a current indoor temperature). In simulating the actuation of the HVAC stages, HVAC state control simulator 622 may receive information indicative of the desired environmental condition (e.g., the desired indoor temperature), and information indicative of the corresponding current environmental condition (e.g., the current indoor temperature), and apply a set of HVAC stage control logic to determine, and output, information indicative of one or more simulated HVAC actuation states. For example, in temperature control simulations, if a desired indoor temperature is higher than the current indoor temperature, then the HVAC state control simulator 622 may output information indicative of actuation of one or more HVAC heating stages. Similarly, if a desired indoor temperature is lower than the current indoor temperature, then the HVAC state control simulator 622 may output information indicative of actuation of one or more HVAC cooling stages. It should be recognized that embodiments are not limited to these particular examples. For example, HVAC systems may include one or more of a variety of stages, a fan stage, first and second heating stages, an emergency heating stage, first and second cooling stages, a humidifier stage, etc., where the stages may be independently (or dependent on one another) actuated.

The indoor temperature predictor 624 is operable to determine an expected change in the current environmental condition (e.g., a change in the current indoor temperature) in response to the simulated actuation state(s) of the HVAC stage(s). In determining the expected change in the current environmental condition, the indoor temperature predictor 624 may rely on a thermodynamic model of the structure that specifies how the structure will behave, thermodynamically, under the influence of an HVAC control system. In some relatively simple cases only one thermodynamic model of the structure may exist, and thus the indoor temperature predictor 624 may rely on that single model to determine the expected changes in the structure's environmental conditions. In other cases, however, a number of models may exist, in which case the indoor temperature predictor 624 may use the most suitable model. For example, different models may be associated with different HVAC actuation states, such as a model being associated with stage one heating being actuated, a different model being associated with stage one cooling being actuated, and yet a different model being associated with stage one heating and a fan being actuated. The most suitable model may thus depend on which HVAC stages are actuated by the HVAC state control simulator 622 and as defined by the information indicative of one or more simulated HVAC actuation states received by the HVAC state control simulator 622. It should also be recognized that in some embodiments, the thermodynamic model(s) may be revised over time so as to, for example, ensure that the applied model accurately reflects the most recent behavioral characteristics of the structure.

In determining the expected change in the current environmental condition, in addition to a thermodynamic model, the indoor temperature predictor 624 may also acquire and use a variety of information. For example, the indoor temperature predictor 624 may acquire and use information such as an expected outdoor environmental characteristic (e.g., an expected outdoor temperature), an expected structural environmental characteristic (e.g., an expected temperature of the structure), a time that is local to the structure for which the environmental characteristics are being determined, etc. In some particular embodiments, some or all of such information may be used with the thermodynamic model in determining the expected thermodynamic behavior of the structure.

In some particular embodiments, the thermodynamic behavior prediction element 620 may receive a schedule of setpoint temperatures ($T^{schedule}$) as information indicative of a desired environmental condition. The schedule $T^{schedule}$ may be implemented as a vector of discrete time-wise elements, where each element is represented by $T^{schedule}(k)$. Thermodynamic behavior prediction element 620 may sequentially apply the setpoint temperatures defined by the vector $T^{schedule}(k)$ to the HVAC state control simulator 622. The HVAC state control simulator 622 then, in turn for each setpoint temperature, determines an appropriate HVAC actuation state. The HVAC actuation states may similarly be implemented as a vector of discrete time-wise elements U(k) (for each HVAC stage), where each element is sequentially output by the HVAC state control simulator 622 in response to input of a corresponding schedule element $T^{schedule}(k)$. Each discrete time-wise element U(k) may then be applied to the indoor temperature predictor 624 which, for each element U(k), determines and outputs an expected change in indoor temperature, $T^{indoor}(k+1)$. For each time increment the expected change in indoor temperature $T^{indoor}(k+1)$ may be fed back to the HVAC state control simulator 622 so that the HVAC state control simulator 622 may determine the expected indoor temperature for comparison with the input setpoint temperature. Once all timesteps have been simulated so that the entire prediction time period has been simulated, the discrete HVAC actuation state elements U(k) may be aggregated to generate an expected HVAC actuation control trajectory and the expected changes in indoor temperature $T^{indoor}(k+1)$ may be aggregated to generate an expected indoor temperature profile.

Thermodynamic model generator 630 includes computational logic that is operable to identify, and in some cases generate, a thermodynamic model for use by the thermodynamic behavior prediction element 620. In some embodiments, the thermodynamic behavior prediction element 620 may be coupled to or otherwise in communication with the thermodynamic model generator 630. In situations where the thermodynamic behavior prediction element 620 is requested to determine an expected thermodynamic behavior of a structure, the thermodynamic prediction element 620 may request a thermodynamic model from the thermodynamic model generator 630. In cases where a single model is used to characterize an environmental characteristic trajectory of the structure, the request may simply request a current version of that model. In cases where a number of different models may be used, the request may include information identifying the actuation state of the HVAC system to assist the thermodynamic model generator 630 in identifying or generating the most suitable model.

As mentioned, the indoor temperature predictor 624 may acquire a thermodynamic model of the structure for characterizing an environmental characteristic trajectory of the structure. In some particular embodiments, the model may be founded upon a preselected, predetermined plurality of basis functions that characterize a contribution of a plurality of basis factors, some of them having direct physical significant and others having only associative mathematical significance, on the environmental characteristic trajectory in response to an actuation state of the HVAC system. The basis functions may include one or more of a variety of functions that are indicative of, for example, an effect from a given HVAC stage, an effect from a previous cycle, a difference in outdoor and indoor temperature, a difference in structure and indoor temperature, and an effect caused by factors other than environmental factors. In some specific embodiments, the basis functions include one or more of the following:

(a) the initial rate from a previous cycle, which dominates at the beginning of the current cycle and eventually disappears, as represented by $(1-g(t^{cycle}))\times r$;

(b) the primary effect from a given stage, which begins at zero, reaches a maximum at approximately $2 \times t^{steady\text{-}state}$, and slowly diminishes thereafter, as represented by $g(t^{cycle})\times\exp(-\sigma t^{cycle})$;

(c) the effect of the difference between outdoor temperature and indoor temperature, as represented by $T^{out}-T^{in}$;

(d) the effect of the difference between structure temperature and indoor temperature, as represented by $T^{structure}-T^{in}$;

(e) the effect of the time of day (in local time), which approximates the effect of sunlight, as represented by $\sin(2\pi \bmod(t,1))$; and (f) a constant representing energy changes not affected by environmental factors.

Figure 7:
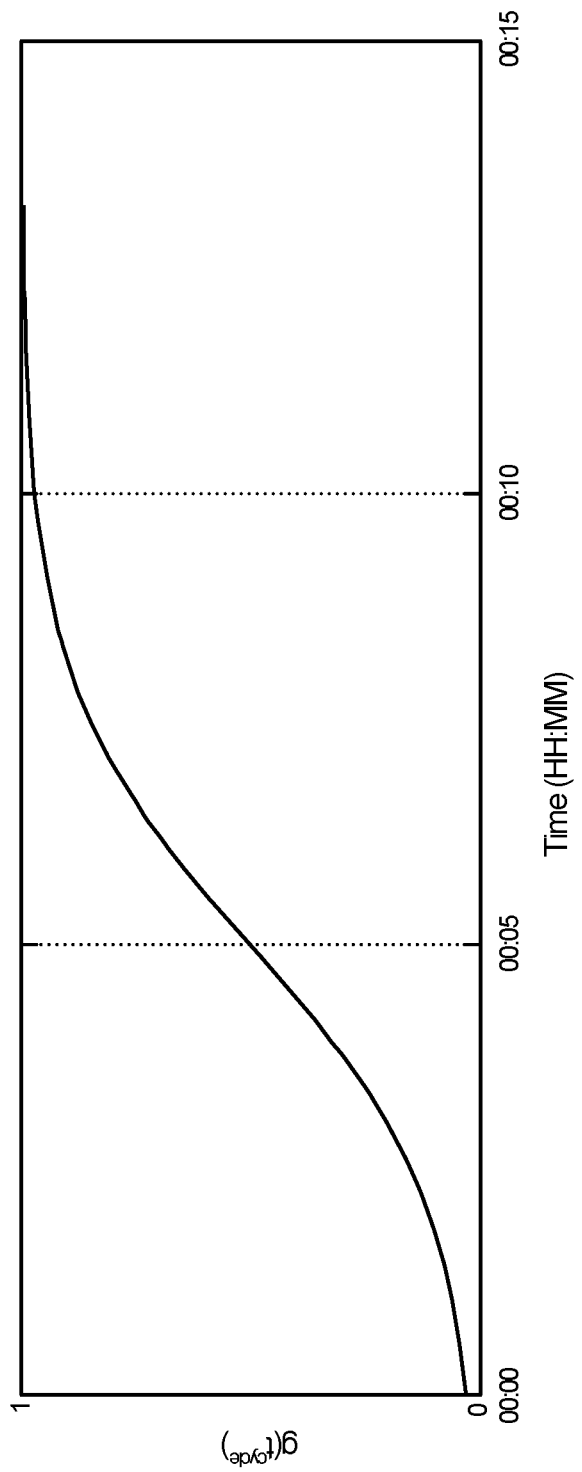
FIG. 7 illustrates an example of $g(t^{cycle})$ according to an embodiment.

Here, $g(t^{cycle})=1/(1+\exp(-\gamma\times(t^{cycle}-t^{steady\text{-}state})))$, r is the initial rate of temperature change at the beginning of a cycle, and $\alpha$ and $\gamma$ are constants. Turning briefly to FIG. 7, FIG. 7 illustrates an example of $g(t^{cycle})$ according to an embodiment. Further, t is the time of day in local time, $t^{cycle}$ is the elapsed time since the beginning of a current cycle, $t^{steady\text{-}state}$ is the estimated time in a cycle that steady-state activity begins to overcome early-cycle activity, $T^{in}$ is indoor temperature, $T^{out}$ is outdoor temperature, $T^{structure}$ is structure temperature, and U is the active HVAC stage(s), such as stage 1 heating, stage 2 heating, stage 2 cooling, auxiliary heating, drifting/HVAC off. It should be recognized that each stage may be associated with a particular state. The state may include a first state of relatively high energy consumption (e.g., an ON state), and a second state of relatively low energy consumption (e.g., an OFF state), where the first state is high energy consumption relative to the second state, and the second state is low energy consumption relative to the first state. In some embodiments, the state may not necessarily be limited to ON and OFF states, but could include states having different amplitudes of control signals. For example, the HVAC actuation state may include a gradient of ON states.

Some or all of these basis functions may be combined in a variety of ways in forming the thermodynamic model. Further, additional or alternative basis functions could be used. In many embodiments, each basis function is weighted, where a specific weighting could be dynamically determined by, e.g., a fitting algorithm (discussed later). One particular thermodynamic model that includes weighted versions of the aforementioned basis functions may be represented as:

$$\Delta T_i^{in}=(1-g(t_i^{cycle}))\times r+w_{j1}\times g(t_i^{cycle})\times\exp(-\sigma t_i^{cycle})+w_{j2}(T_i^{out}-T_i^{in})+w_{j3}(T_i^{structure}-T_i^{in})+w_{j4}\times\sin(2\pi\bmod(t_i,1))+w_{j5}$$

where $w_{j1}$, $w_{j2}$, $w_{j3}$, $w_{j4}$, and $w_{j5}$ are weighting factors corresponding to each basis function, and $\Delta T_{i+1}^{in}=T_{i+1}^{in}-T_i^{in}$.

In operation, the thermodynamic behavior prediction element 620 may acquire a variety of information prior to simulating the thermodynamic behavior of the structure. For example, thermodynamic behavior prediction element 620 may acquire values for the weighting factors $w_{j1}$, $w_{j2}$, $w_{j3}$, $w_{j4}$, and $w_{j5}$ from the thermodynamic model generator 630, an expected outdoor temperature $T_i^{out}$ over the prediction time period from a remote entity, and values for the constants $\sigma$ and $\gamma$. As the thermodynamic behavior prediction element 620 progresses through the time-wise sequence of input desired environmental conditions, the predicted indoor temperature at a given time during the prediction period may be used as an input, such as $T_i^{in}$, for predicting the thermodynamic behavior at a subsequent time in the prediction.

In some embodiments, the temperature of the structure, $T^{structure}$, may be determined using one or more sensors operable to detect such information (e.g., a temperature sensor coupled to a wall of the structure). In other embodiments, however, the temperature of the structure may not be directly acquired, but rather may be estimated. In estimating the structure temperature, an initial structural temperature may be set to an indoor temperature at a certain time. The time may be selected as a transition time between environmental characteristics in or around the structure. For example, the time may be selected as the time during which a hot period of the day transitions to a cool period. This may be determined, for example, by determining the maximum and minimum temperatures over a certain period, determining the average temperature over that period, and then determining the time at which the average temperature is reached. In a number of environments, this may be around 11 pm, midnight, 1 am, a time between 11 pm and 1 am, or a time before 11 pm or after 1 am.

Once the transition time is determined, an initial structure temperature may be set to the indoor temperature at that time, and then for each of a plurality of successive times thereafter, the estimated structural temperature may be determined as a weighted combination of previous indoor and outdoor temperatures. The weightings may be equal to one another, such that indoor temperature and outdoor temperature are equally considered in estimating the structure temperature, or could be different than one another. For example, the structure temperature may be estimated at a timestep n by first letting $T_0^{structure}=T_{midnight}^{in}$ and then using the update rule $T_i^{structure}=(1-\alpha-\beta)T_{i-1}^{structure}+\alpha T_i^{in}+\beta T_i^{out}$ for successive times after midnight, where $T_0^{structure}$ is the initial temperature of the structure, $T_{midnight}^{in}$ is the indoor temperature at midnight, $\alpha$ and $\beta$ are constants between 0 and 1.

It should be recognized that a distinction may be drawn between activity at the beginning of a cycle and activity at the middle and end of a cycle, where a cycle is a period over which an HVAC system is actuated in accordance with a particular HVAC actuation state. At the beginning of a cycle (e.g., the first 5-10 minutes), early-cycle activity occurs during which most of the temperature change is carried over from a previous cycle, and the HVAC begins to ramp up. After the beginning of the cycle (e.g., after 10 minutes), steady-state activity occurs during which HVAC effect gradually diminishes as the temperature moves toward the setpoint and away from the outdoor temperature, and changes in outdoor temperature, structure temperature, and time of day greatly affect the temperature profile. As used herein, "cycle" refers to a period during which a particular HVAC actuation state is in effect with respect to the energy-consuming parameters (i.e., actuation stage(s)) of interest for the model being considered. For example, consider a scenario in which the parameter of interest is simply whether the heating is ON or OFF. In a simple single-stage HVAC system, the time that the HVAC is ON and then OFF represents two distinct consecutive cycles. However, in a more complex HVAC system having multiple stages such as a heating stage and a fan, the time that heater is on (regardless of fan state), and then the heater is off (regardless of fan state), represents two distinct consecutive cycles. In this more complex system, the state of the fan does not impact the duration of the cycle since the parameter of interest for the particular model is only concerned with the state of the heater.

To capture this behavior, $g(t^{cycle})$ may set equal to $1/(1+\exp(-\gamma \times (t^{cycle}-t^{steady-state})))$, where $t^{steady-state}$ is the estimated time in a cycle that steady-state activity begins to overcome early-cycle activity, as previously described. This is a monotonic non-decreasing logistic function that increases smoothly after the beginning of the cycle, as shown in FIG. 7.

It should also be recognized that the initial rate of temperature change as a given cycle begins may determine much of its shape before steady-state activity begins. The variable r may thus be defined as the initial rate of temperature change at the beginning of a cycle, such that $r_j = T_{beginning\ of\ cycle\ j} - T_{end\ of\ cycle\ j-1}$. Then, for each timestep i, the variable r is defined as $r_i = r_{j:i \in j}$. That is, the value of r at any point in time may be the value of r at the beginning of the cycle containing that point.

System 600 in certain embodiments implements thermodynamic behavioral modeling and includes a variety of components such as an HVAC control element 610, a thermodynamic behavior prediction element 620, and a thermodynamic model generator 630, according to various embodiments. However, it will be appreciated by those skilled in the art that systems that perform the various operations described herein could operate equally well with fewer or a greater number of components than are illustrated in FIG. 6. Thus, the depiction of system 600 in FIG. 6 should be taken as being illustrative in nature, and not limiting to the scope of the present teachings.

Figure 8:
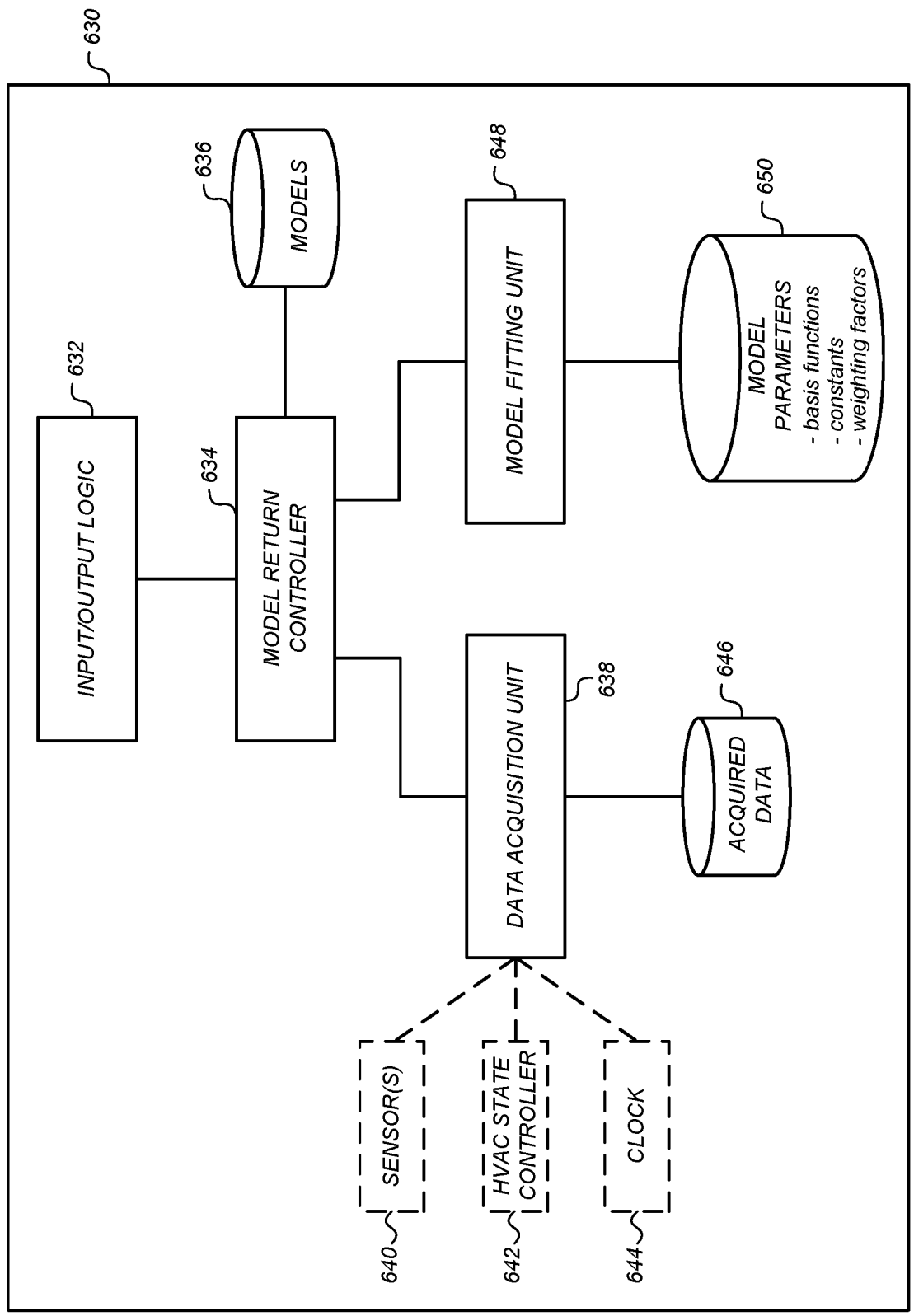
FIG. 8 illustrates a thermodynamic model generator according to an embodiment.

Turning now to FIG. 8, FIG. 8 illustrates a thermodynamic model generator 630 according to an embodiment. The thermodynamic model generator 630 operates to identify and/or, in some cases generate, a thermodynamic model that characterizes an environmental characteristic trajectory of a structure in response to application of an HVAC actuation state. Thermodynamic model generator 630 includes a variety of components, such as input/output logic 632, a model return controller 634, a model storage element 636, and a data acquisition unit 638 coupled to sensor(s) 640, an HVAC state controller 642, and a clock 644. The thermodynamic model generator 630 may further include a data storage element 646, a model fitting unit 648, and a model parameter storage element 650. Each of these components may be physically, logically, or communicatively coupled to one another, and in some embodiments the structural elements and/or functionality thereof described herein for one or more components of model generator 630 may similarly be implemented in other components of model generator 630. Moreover, the components of model generator 630 can be implemented in hardware, software, or any combination thereof, and while in one embodiment the components of model generator 630 may be implemented in device 100, other embodiments are not so limited as either some or all of the components may be implemented in electronic devices (e.g., devices associated with smart home environment 200 such as portable electronic device 266 and/or remote server 264) other than device 100.

Thermodynamic model generator 630 may be operable to identify and/or generate a model in response to a request for a thermodynamic model. Once a model has been identified or otherwise generated, thermodynamic model generator 630 may return the model and/or components thereof. For example, in response to a request for a model communicated from thermodynamic behavior prediction element 620, model generator 630 may identify a thermal model and communicate the thermal model to the prediction element 620, where the communicated model may include one or more model parameters that characterize the model, such as values for the weighting factors $w_{j1}$, $w_{j2}$, $w_{j3}$, $w_{j4}$, and $w_{j5}$. In some embodiments, one or more models may have already been generated at the time the request is received, and in some situations (e.g., if those models are still valid, i.e., generated based on data that was acquired relatively recently with respect to the time of receiving the request, such as within 24 hours) a model that has already been generated may be returned. In some embodiments, the request may indicate a level of specificity desired for a model. For example, a model may have been generated based on data created when both a stage one and a stage two heater were actuated. The request may indicate that it requires a model that was generated based on data created when both a stage one and stage two heater were actuated, but also a fan was actuated. In response to the request, the model generator 630 may search for candidate models that have already been generated and may satisfy the requested level of specificity. If no candidate models are found, then a new model may be generated and returned. If one candidate is found, then that model may be returned. If multiple candidates are found, then the most restrictive model may be returned. In this particular example, the existing model may not be sufficiently specific to satisfy the request, in which case a new model may be generated that is tailored to the request.

Input/output logic 632 includes logic operable to communicatively interface components of the thermodynamic model generator 630 with other components, such as thermodynamic behavior prediction element 620. Input/output logic 632 may thus be operable to receive, interpret, formulate and communicate responses to requests for thermal models.

Model return controller 634 may be operable to perform a variety of operations, including analyzing a request for a model, searching for existing models, identifying a specific model to return in response to the request, instructing the data acquisition unit 638 to acquire data to generate a new model, and instructing the model fitting unit 648 to fit weighting factors for a new model. Model return controller 634 may be coupled to the input/output logic 632, model storage element 636, data acquisition unit 638, and model fitting unit 648.

Model storage element 636 may store one or more thermodynamic models, including parameters thereof. For example, model storage element 636 may include information indicative of the basis functions used in a particular model, the value of any constants used in the model, and the value of any weighting factors used in the model. For each model, model storage element 636 may also include information indicative of the specificity level of the model, where the specificity level may indicate the type of data that was used to generate the model. For example, the specificity level may indicate the type of stages that were active for the data that was used to generate the model.

Data acquisition unit 638 may be operable to acquire a variety of data for use in generating a thermodynamic model. For example, data acquisition unit 638 may be coupled to one or more sensors 640 for receiving sensed information such as indoor temperature, outdoor temperature, indoor humidity, outdoor humidity, occupancy, etc. Data acquisition unit 638 may also be coupled to an HVAC state controller 642 which indicates the HVAC actuation state over time (e.g., whether stage one heating is on, stage two heating is on, emergency heating is on, etc.). Data acquisition unit 638 may also be coupled to a clock 644 which may provide timing signals for correlating the information received by the sensor(s) 640 and HVAC state controller 642. A variety of types of information that may be used in thermodynamic model generation are further described in commonly assigned U.S. Ser. No. 12/881,430 (Ref. No. NES002-US), filed Sep. 14, 2010, the entire contents of which are incorporated herein in their entirety for all purposes. Data acquisition unit 638 may also be coupled to a data storage element 646 which may be operable to store the data acquired by the data acquisition unit 638.

Model fitting unit 648 may be operable to fit the basis function weighting factors associated with a set of basis functions to some or all of the acquired data. These weighting factors may be fit using one or more of a variety of fitting techniques, including but not limited to least-squares fitting. The weighting factors may be fit using any suitable history of data, including 1 day, 3 days, 5 days, 7 days, 10 days, 14 days, a number of days in a range of 1 to 14, or a number of days less than 1 or greater than 14. In fitting the weighting factors, model fitting unit 648 may first identify one or more basis functions for which representations are stored in the model parameter storage element 650. For example, model fitting unit 648 may identify and select one or more of the previous described basis functions. Once the basis functions used to construct the model are selected, any suitable constants that may be associated with those basis functions, such as one or more of the previously described constants, may be identified and their values determined. Model fitting unit 648 may then determine the appropriate historical data stored in acquired data element 646 to use (where the appropriate data may be defined by the model request) and fit the weighting factors to that historical data so that the weighted basis functions characterize the historical thermodynamic response of the structure and can thus be subsequently used for predicting the future thermodynamic response of the structure. In some embodiments, model fitting unit 648 uses data generated only during a certain time period, such as from local midnight to local midnight. In such a case, the frequency of generating models may be reduced as models created based on the same criteria but within the same 24 hour period may be identical to one another.

Thermodynamic model generator 630 operates to identify and/or, in some cases generate, a thermodynamic model, and includes a variety of components such as input/output logic 632, a model return controller 634, a model storage element 636, a data acquisition unit 638, a data storage element 646, a model fitting unit 648, and a model parameter storage element 650. However, it will be appreciated by those skilled in the art that systems that perform the various operations described herein could operate equally well with fewer or a greater number of components than are illustrated in FIG. 8. Thus, the depiction of thermodynamic model generator 630 in FIG. 8 should be taken as being illustrative in nature, and not limiting to the scope of the present teachings.

Figure 9:
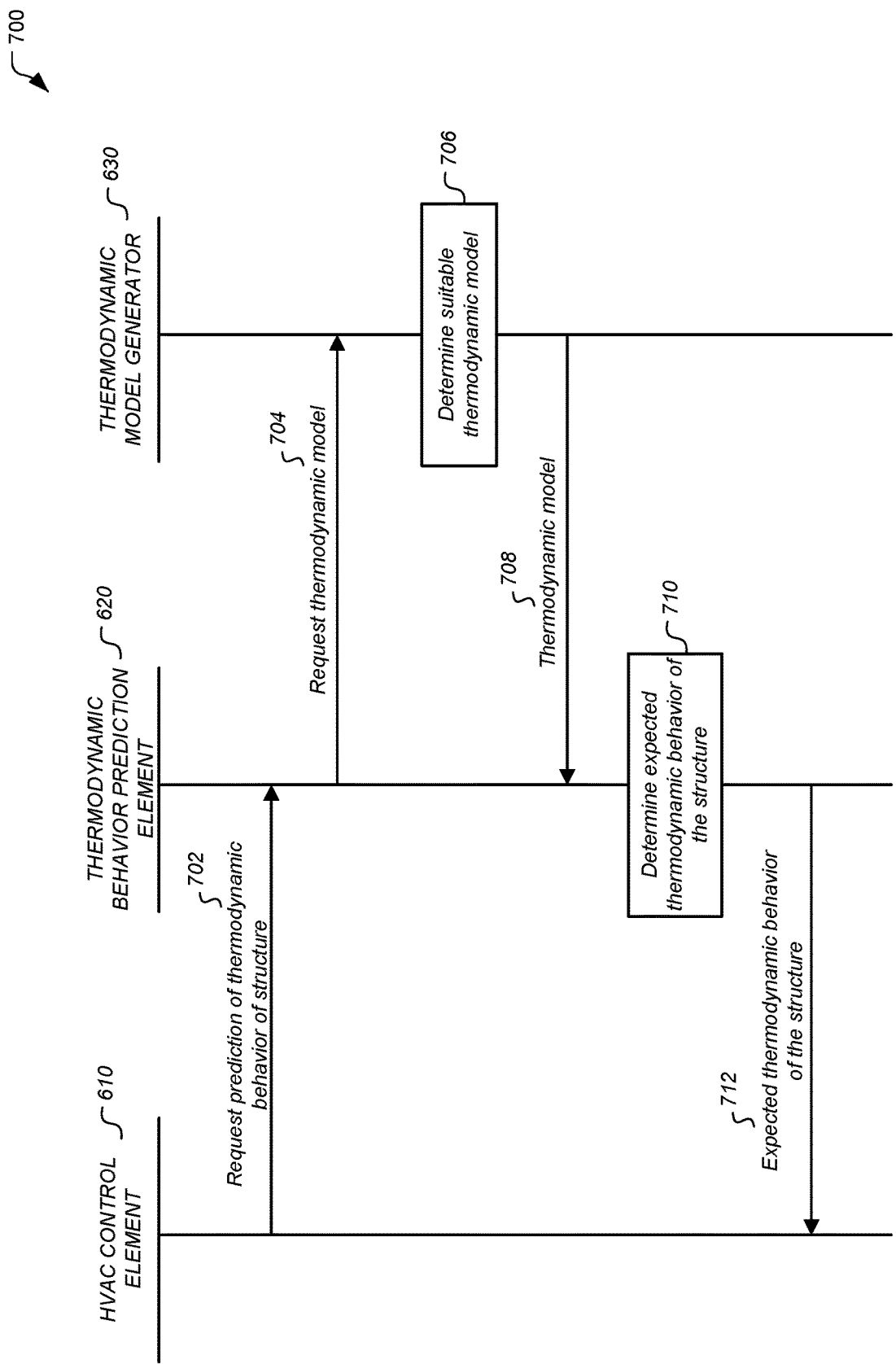
FIG. 9 illustrates a communication sequence of a process for determining an expected environmental response of a structure to possible changes in the actuation state of an associated HVAC system according to an embodiment.

FIG. 9 illustrates a communication sequence of a process 700 for determining an expected environmental response of a structure to possible changes in the actuation state of an associated HVAC system according to an embodiment. To facilitate understanding, the process 700 is described with reference to FIGS. 6 through 8, although it should be understood that embodiments of the process 700 are not limited to the exemplary systems and apparatus described with reference to FIGS. 6 through 8.

In operation 702, HVAC control element 610 communicates a request for a prediction of the thermodynamic behavior of a structure to the thermodynamic behavior prediction element 620. In some specific embodiments, the request may include a request for an expected indoor temperature profile, an expected indoor humidity profile, or a profile characterizing one or more other expected environmental characteristics. The request may include some, none, or all of a variety of information in support of the request. For example, the request may include a desired HVAC control trajectory that characterizes the desired control of the HVAC system over the prediction time period, such as a schedule of setpoint temperatures for the prediction time period.

In response to receiving the request, in operation 704 thermodynamic behavior prediction element 620 may request a suitable thermodynamic model from the thermodynamic model generator 630. In some embodiments, the request may indicate a level of specificity desired for a model, such as an indication of the actuation state of one or more stages of the HVAC system for which the model is to be suited for. In other embodiments, the request may also or alternatively indicate the basis functions which should be used to generate the model. For example, in some embodiments the number or selection of basis functions used by the thermodynamic behavior prediction element 620 may change, and/or the thermodynamic model generator 630 may store a number of different models where different basis functions are used in the different models. Accordingly, the request may indicate which specific basis functions are being implemented by the thermodynamic behavior prediction element 620 at a given time, and thus the specific basis functions by which a model should be generated.

In response to receiving a request for a thermodynamic model, in operation 706 thermodynamic model generator 630 may determine a suitable thermodynamic model that satisfies the request. This may include searching pre-existing models for a model that is most suitable, and/or generating a new model that is catered to the request.

Once a suitable model has been identified, in operation 708 the model may be returned to the thermodynamic behavior prediction element 620. In returning the model, a variety of information may be communicated, such as information indicative of the value of any basis function weighting factors, the value of any constants used in conjunction with the basis function, and in some cases an identification of the basis functions used by the model.

In response to receiving the model, thermodynamic behavior prediction element 620 may determine the expected thermodynamic behavior of the structure based on the model and a desired HVAC control trajectory, such as a schedule of setpoint temperatures for the prediction time period. Once the expected thermodynamic behavior of the structure is determined, in operation 712 it may be returned to the HVAC control element 610. This may include, for example, returning one or more of an expected indoor temperature profile, an expected indoor humidity profile, an expected HVAC actuation trajectory, or the like.

It should be appreciated that the specific operations illustrated in FIG. 9 provide a particular process for determining an expected environmental response of a structure to possible changes in the actuation state of an associated HVAC system according to various embodiments. Other sequences of operations may also be performed according to alternative embodiments. For example, alternative embodiments of the present invention may perform the operations outlined above in a different order. Moreover, the individual operations illustrated in FIG. 9 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 10:
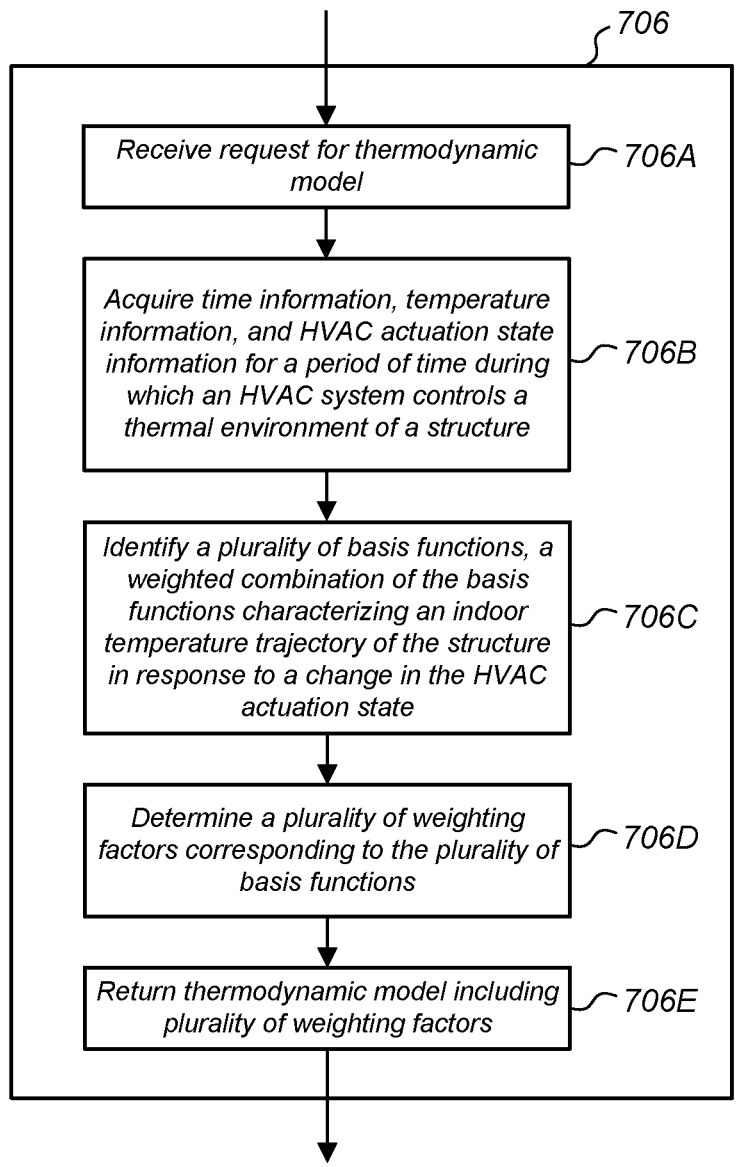
FIG. 10 illustrates a process for determining a suitable thermodynamic model according to an embodiment.

FIG. 10 illustrates a process for determining a suitable thermodynamic model according to an embodiment. To facilitate understanding, the process is described with reference to FIGS. 6 through 9, although it should be understood that embodiments of the process are not limited to the exemplary systems and apparatus described with reference to FIGS. 6 through 9. In some embodiments and as described herein, the process may be implemented as operation 706. However, it should be recognized that embodiments are not so limited, as the process(es) described herein could be implemented in operations other than operation 706.

In operation 706A, a request for a thermodynamic model is received. For example, thermodynamic model generator 630 may receive a request for a thermodynamic model communicated from thermodynamic behavior prediction element 620.

In operation 706B, time information, temperature information, and HVAC actuation state information is acquired for a period of time during which an HVAC system controls an environmental characteristic (e.g., a thermal environment) of a structure. For example, data acquisition unit 638 may acquire time information such as the time of day in local time, the elapsed time since the beginning of a current cycle, the estimated time in a cycle that steady-state activity begins to overcome early-cycle activity, and the like, where some or all of such data may be acquired from an internal or external clock 644. Data acquisition unit 638 may acquire temperature information such as the indoor temperature, outdoor temperature, structure temperature, and the like, where some or all of such data may be acquired from one or more sensors 640. Data acquisition unit 638 may also or alternatively acquire HVAC actuation state information, which may indicate which stage or stages or the HVAC system were actuated during the period of time during which the HVAC system controlled the thermal environment of the structure from, e.g., HVAC state controller 642.

In operation 706C, a plurality of basis functions are identified, where a weighted combination of those basis functions characterize an indoor temperature trajectory of the structure in response to a change in the HVAC actuation state. For example, basis functions indicating the initial rate from a previous cycle, the primary effect from a given stage, the effect of the difference between outdoor temperature and indoor temperature, the effect of the difference between structure temperature and indoor temperature, the effect of the time of day, and a constant representing energy changes not affected by environmental factors may be identified.

In operation 706D, a plurality of weighting factors corresponding to the basis functions may be determined. For example, weighting factors such as the previously described $w_{j1}$, $w_{j2}$, $w_{j3}$, $w_{j4}$, and $w_{j5}$ may be determined by fitting them to the acquired data.

In operation 706E, a thermodynamic model including the weighting factors is returned. For example, information indicative of the value of the weighting factors $w_{j1}$, $w_{j2}$, $w_{j3}$, $w_{j4}$, and $w_{j5}$ may be communicated from the thermodynamic model generator 630 to the thermodynamic behavior prediction element 620.

It should be appreciated that the specific operations illustrated in FIG. 10 provide a particular process for determining a suitable thermodynamic model according to an embodiment. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

As described with reference to FIG. 8, a number of models may be stored in model storage element 636 for use by the thermodynamic behavior prediction element 620. In many embodiments, the first time a model is needed on a particular (e.g., local) day, the model may trained (i.e., generated) and the parameters thereof stored in a model cache such as model storage element 636. While the models may subsequently be used to satisfy subsequent requests, in some embodiments the models stored in model storage element 636 may become stale after a certain period of time, such as after 24 hours. In some cases, the time period during which a stored model is valid may be correlated with the time period of data used to generate the models. Once a model becomes stale, even if the model may be suitable to satisfy a model request, the model may not be returned but rather a new model may be generated.

As also previous described, an HVAC system may include a number of stages, such as a fan, stage one heat, stage two heat, etc. A request for a thermodynamic model may indicate a desired level of specificity. If a model exists that satisfies the requested criteria, such a model may be returned. Otherwise, a new model specifically tailored to the requested criteria may be generated and returned.

For example, in some embodiments, an HVAC actuation state may be defined by binary settings of the stages, where each stage may have a binary ON state or a binary OFF state. Table 1 illustrates an example sequence of HVAC states.

TABLE 1

| Example sequence of HVAC states. | | | | | | | | |
| --- | --- | --- | --- | --- | --- | --- | --- | --- |
| Stage | 12:00 am | 7:35 am | 7:43 am | 7:50 am | 7:55 am | 8:10 am | 9:30 am | 9:50 am |
| Fan | off | ON | off | ON | ON | off | ON | off |
| StageOneHeat | off | ON | off | ON | ON | off | ON | off |
| StageTwoHeat | off | off | off | off | ON | off | ON | off |
| EmergencyHeat | off | off | off | off | off | off | off | off |

In making a request for a model, thermodynamic behavior prediction element 620 may make a request such as "Give me a model for the structure which is valid when StageOneHeat is on." A problem with such a request, however, is that there is no data measured when only StageOneHeat is on because the Fan is also always on at the same time. Of course, the thermodynamic behavior prediction element 620 probably doesn't care if the fan is on. So the request should really be more specific, such as "Give me a model for the structure which is valid when StageOneHeat is on and I don't care about the other stages." A problem with this request, however, is that as indicated in Table 1, some of the data when StageOneHeat is on was collected while StageTwoHeat was also on, and the StageTwoHeat data probably distorts the model. Accordingly, when requesting a model, thermodynamic behavior prediction element 620 should specify which switches it cares about in addition to the specific settings of those switches. For example, thermodynamic behavior prediction element 620 may make a request such as "Give me a model for the structure which is valid when StageOneHeat is on and StageTwoHeat is off and EmergencyHeat is off and I don't care about the settings of any other stages." In view of these complexities, when making a request for a model, thermodynamic behavior prediction element 620 may specify the set of stages that it cares about in the form of a mask.

After the most specific example request above, there will be model in the model storage element 636 that was generated from:
  mask: Fan—don't care; StageOneHeat—care; StageTwoHeat—care; EmergencyHeat—care
  actuation state: Fan—N/A; StageOneHeat—On; StageTwoHeat—Off; EmergencyHeat—Off Any subsequent request for "Give me a model for the structure which is valid when StageOneHeat is on and StageTwoHeat is off and EmergencyHeat is off and I don't care about the settings of any other stages" will get this same model and be able to reuse it.

A couple of challenges arise with this fairly strict model-matching policy. First, any request for "Give me a model for the structure which is valid when StageOneHeat is on and I care about all the other switches and they must be off" will not be able to use the aforementioned model because it was trained on some data which was taken when the fan was on. A new model would have to be fit against the smaller subset of data. Second, any request for "Give me a model for the structure which is valid when StageOneHeat is on and I don't care about the settings of any other switches" will also not be able to reuse this model because the model did not use the data when StageTwoHeat was on. Thus, the model was not trained on all of the available data and a new model would have to be fit against a larger set of data.

In some embodiments, a model's definition may be expanded during fitting. Using the example above, a request for "Give me a model for the structure which is valid when StageOneHeat is on and StageTwoHeat is off but I don't care about Fan or EmergencyHeat" will not be able to reuse the same model because the model was trained on data for which EmergencyHeat was off. In this request for a model, the thermodynamic behavior prediction element 620 doesn't care about the EmergencyHeat setting and so the prefit model isn't general enough. However, as we can see from the data, when the model was fit for EmergencyHeat off, the model fitting unit 648 could have noticed that there was no data when the EmergencyHeat was on. So, a request which said "I don't care about EmergencyHeat" would have got exactly the same results as the more restrictive request for a model "when EmergencyHeat is off". Thus, the model fitting unit 648 can change the request on the fly from "EmergencyHeat must be off" to "I don't care about EmergencyHeat" without changing the model parameters. Now the more general model can be reused for the 2nd request, above. Of course, every time new data is collected and the model is refit, the same validation may be made again to ensure there isn't any data with EmergencyHeat on creeping into the model used by the thermodynamic behavior prediction element 620 for the instance it specified it only wants data when EmergencyHeat is off.

In some embodiments, a model's definition may be restricted during fitting. Similar to the above example, assume a request had been made for a model "when StageOneHeat is on and I don't care about Humidification." During fitting, the model fitting unit 648 may notice that although the request didn't care about humidification, in fact, humidification was always off. If the fitting algorithm makes note of that fact in the model, then a second subsequent request for "when StageOneHeat is on and Humidification must be off" could reuse the same model.

Thus, in some embodiments, a model may keep track of various bits independently for each HVAC stage as illustrates in Table 2.

TABLE 2

Bits used to identify model status.

| MaskEither | Both | On | Notes |
|---|---|---|---|
| 1 | 1 | N/A | The model was requested without regard to this switch state. During fitting, data from both values of this switch state were used: ON and OFF |
| 1 | 0 | 0 | The model was requested without regard to this switch state. During fitting, it was found that all the data available happen to have this switch set to OFF |
| 1 | 0 | 1 | The model was requested without regard to this switch state. During fitting, it was found that all the data available happen to have this switch set to ON |
| 0 | 0 | 0 | The model was trained using only data for which this switch was set to OFF by request. (it is unknown if data exists for when this switch was ON) |
| 0 | 0 | 1 | The model was trained using only data for which this switch was set to ON by request. (it is unknown if data exists for when this switch was OFF) |
| 0 | 1 | 0/1 | Not valid. |

In Table 2, the MaskEither bit is an input into the fitting algorithm, where the model request may specify this as the mask parameter.

The On bit, if MaskEither=0 (i.e., false), then indicates that the setting of the HVAC stage matters, and the On bit may be specified in the model request as an input into the fitting algorithm.

The Both bit is an output from the model fitting unit 648 after model fitting is complete, and may be set to reflect the data which was chosen to fit the model.

The On bit, if MaskEither=1 (i.e., true) and the Both bit=0 (i.e., all of the data was either On or Off), then this bit is also an output from the model fitting unit 648 to reflect the data which was chosen to fit the model.

Figure 11:
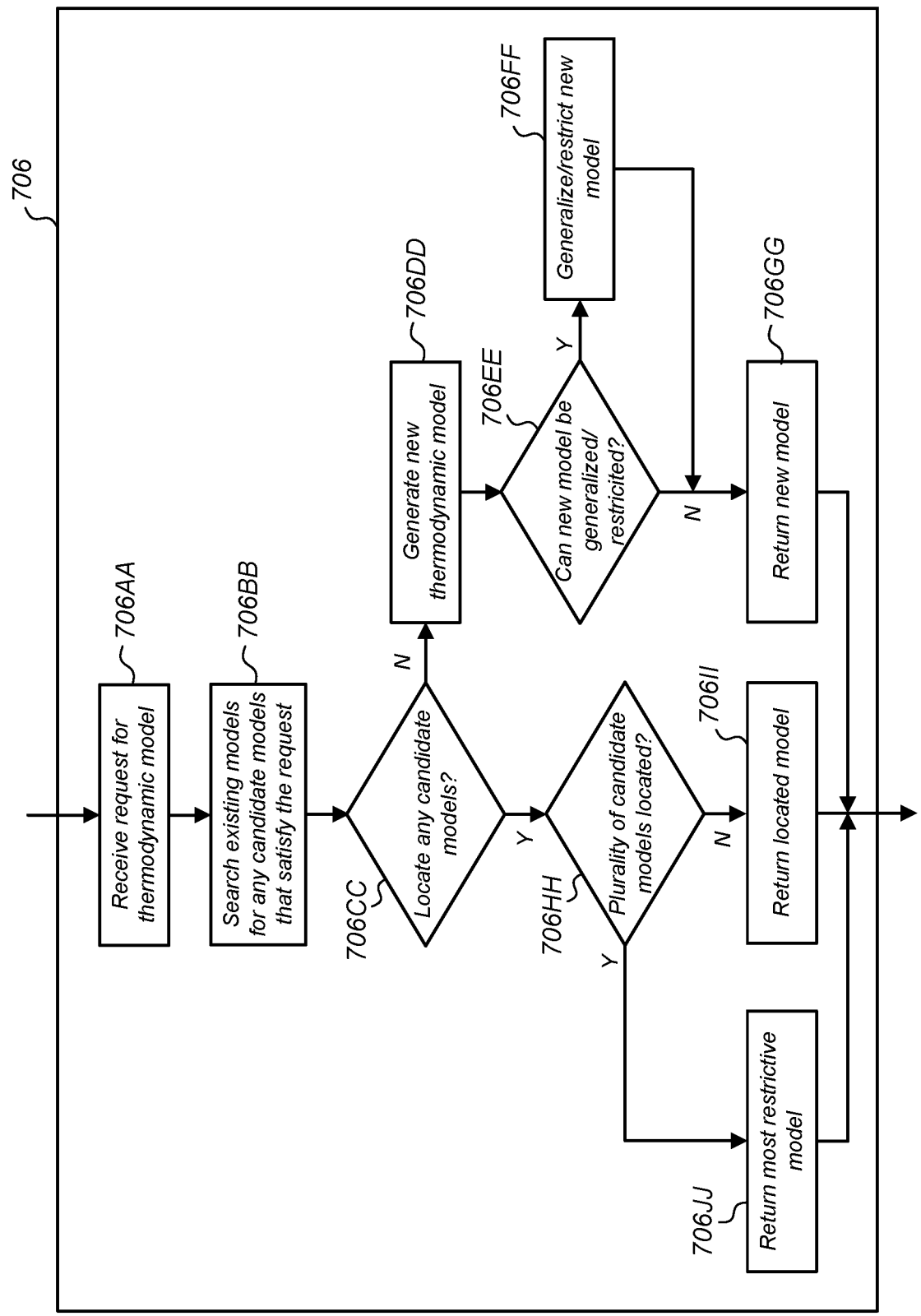
FIG. 11 illustrates a process for determining a suitable thermodynamic model according to another embodiment.

Turning now to FIG. 11, FIG. 11 illustrates a process for determining a suitable thermodynamic model according to another embodiment. To facilitate understanding, the process is described with reference to FIGS. 6 through 10, although it should be understood that embodiments of the process are not limited to the exemplary systems and apparatus described with reference to FIGS. 6 through 10. In some embodiments and as described herein, the process may be implemented as operation 706. However, it should be recognized that embodiments are not so limited, as the process(es) described herein could be implemented in operations other than operation 706.

In operation 706AA, a request for a thermodynamic model is received. For example, thermodynamic model generator 630 may receive such a request from thermodynamic prediction element 620. The request may indicate a desired level of specificity for a returned model. For example, the request may include a mask indicating which HVAC stages it would like the model to be tailored to, and the actuation state of each of those stages.

In operation 706BB, existing models are searched for any candidate models that satisfy the request. For example, model return controller 634 may search the model storage element 636 for one or more models that satisfy the request. Such models may satisfy the request if they have the desired level of specificity or an acceptable level of generality.

In operation 706CC, it is determined whether any candidate models are located as a result of the search. If not, then processing may continue to operation 706DD where a new thermodynamic model is generated. A new thermodynamic model may be generated, for example, by model fitting unit 648, as discussed with reference to operations 706B through 706D. Further, the new thermodynamic model may be generated based on the level of specificity indicated in the request.

Once a new model is generated, processing may continue to operation 706EE where it is determined whether the new model may be generalized or restricted. The new model may be generalized, or expanded, if it is determined that the data used to generate the model having the requested level of specificity may also satisfy a model request indicating a less restrictive level of specificity. Similarly, the new model may be restricted, or narrowed, if it is determined that the data used to generate the model having the requested level of specificity may also satisfy a model request indicating a more restrictive level of specificity.

If the new model may be generalized or restricted, then processing may continue to operation 706FF where the new model is generalized or restricted. In generalizing/restricting the new model, information indicating the different levels of specificity for which the model applies may be associated with the model and stored in model storage element 636.

Processing may then continue to operation 706GG where the new model is returned. For example, in response to a request for a model communicated to thermodynamic model generator 630, thermodynamic model generator 630 may return the new model to thermodynamic behavior prediction element 620.

Returning to operation 706CC, if it is determined that there is at least one candidate model available that is sufficient to satisfy the model request, processing may continue to operation 706HH where it is determined whether there are a plurality of candidate models. If there is only one model, then in operation 706II that model may be returned. Otherwise, processing may continue to operation 706JJ where one of the candidate models is returned. In some embodiments, the most restrictive model may be returned.

It should be appreciated that the specific operations illustrated in FIG. 11 provide a particular process for determining a suitable thermodynamic model according to an embodiment. Other sequences of operations may also be performed according to alternative embodiments. For example, alternative embodiments of the present invention may perform the operations outlined above in a different order. Moreover, the individual operations illustrated in FIG. 11 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Further, embodiments may include some or all of the systems, methods, apparatus, etc. described in one or more of the following commonly assigned applications, each of which is incorporated by reference herein in its entirety for all purposes: U.S. Ser. No. 13/842,213, supra; U.S. Ser. No. 13/632,118 filed Sep. 30, 2012; U.S. Ser. No. 13/632,093 filed Sep. 30, 2012; U.S. Ser. No. 13/632,028, supra; U.S. Ser. No. 13/632,041 filed Sep. 30, 2012; U.S. Ser. No. 13/632,070 filed Sep. 30, 2012; U.S. Prov. Ser. No. 61/704,437, supra; PCT Application No. PCT/US12/20026 filed Jan. 3, 2012; PCT Application No. PCT/US12/00007, filed Jan. 3, 2012; and U.S. Ser. No. 13/269,501 filed Oct. 7, 2011.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. An intelligent network-connected thermostat for controlling an operation of an HVAC system in a smart home environment, the thermostat comprising:
    HVAC control circuitry operable to actuate one or more elements of the HVAC system;
    one or more sensors for measuring characteristics of the smart home environment; and
    a processor coupled to the HVAC control circuitry and the one or more sensors and operable to cause the thermostat to perform operations including:
        acquiring time information, temperature information, and HVAC actuation state information for a period of time during which the HVAC system controls a thermal environment of a structure;
        determining a plurality of weighting factors corresponding to a respective plurality of predetermined basis functions, the weighted combination of basis functions characterizing an indoor temperature trajectory of the structure in response to a change in the HVAC actuation state, the basis functions including an inertial carryover component that characterizes a carryover of a rate of indoor temperature change that was occurring immediately prior to the change in actuation state; and
        providing a thermodynamic model including the determined plurality of weighting factors corresponding to the respective plurality of predetermined basis functions.

2. The thermostat of claim 1, wherein the basis functions further include a current stage effect component that characterizes an effect that a current stage has on the indoor temperature trajectory of the structure.

3. The thermostat of claim 2, wherein the current stage effect component begins at zero, reaches a maximum after a certain period of time, and diminishes thereafter.

4. The thermostat of claim 1, wherein the plurality of weighting factors are determined using only information that is available local to the thermostat except for an externally provided weather forecast and an externally provided clock signal.

5. The thermostat of claim 1, wherein the HVAC actuation state is: a first state characterized by a relatively high first energy consumption, or a second state characterized by a relatively low energy consumption.

6. The thermostat of claim 1, wherein the basis functions comprise at least one basis function that has associative mathematical significance on the indoor temperature trajectory.

7. The thermostat of claim 1, wherein the inertial carryover component that characterizes a carryover of a rate of indoor temperature change that was occurring immediately prior to the change in actuation state is represented by:

$$\left(1 - \frac{1}{1 + e^{-\gamma(t^{cycle} - t^{steady-state})}}\right) \cdot r;$$

wherein r represents the rate of temperature change that was occurring in the structure prior to actuating the HVAC function;
wherein $\gamma$ represents a constant value;
wherein $t^{cycle}$ represent a time elapsed since actuating the HVAC function; and
wherein $t^{steady-state}$ represents a time.

8. The thermostat of claim 7, wherein the plurality of basis functions further include a current stage effect component that begins at zero, reaches a maximum at $2 \times t^{steady-state}$, and diminishes thereafter.

9. The thermostat of claim 1, wherein the plurality of basis functions further comprises a basis function characterizing an effect of a difference between an outdoor temperature and an indoor temperature.

10. The thermostat of claim 1, wherein the operations the processor is configured to perform further include estimating a temperature of the structure by:
setting an initial temperature of the structure to an indoor temperature at a first time; and
for each of a plurality of times after the first time, determining the temperature of the structure as a weighted combination of a previous indoor temperature and a previous outdoor temperature.

11. The thermostat of claim 1, wherein the plurality of basis functions further comprises a basis function characterizing an effect of a difference in a temperature of the structure and an indoor temperature.

12. The thermostat of claim 1, wherein the plurality of basis functions further comprises a basis function characterizing an effect of a time-of-day approximating an effect of sunlight.

13. The thermostat of claim 12, wherein the basis function characterizing the effect of the time-of-day approximating the effect of sunlight comprises a sinusoidal term having a period of 24 hours.

14. The thermostat of claim 1, wherein the plurality of basis functions further comprises a basis function comprising a constant representing energy changes not affected by environmental factors.

15. The thermostat of claim 1, wherein the operations the processor is configured to perform further include:
using a required level of specificity for the thermodynamic model.

16. The thermostat of claim 15, wherein the operations the processor is configured to perform further include:
searching a plurality of existing thermodynamic models for one or more candidate thermodynamic models that satisfy the required level of specificity for the thermodynamic model.

17. The thermostat of claim 16, wherein providing the thermodynamic model that predicts the temperature trajectory of air inside the structure in response to the actuation of the HVAC function comprises:
failing to identify one or more candidate models; and
in response to failing to identify the one or more candidate models, generating the thermodynamic model.

18. The thermostat of claim 1, wherein the processor is further configured to predict the temperature trajectory of air inside the structure by calculating a time-wise series of temperature changes beginning at a current indoor temperature.

* * * * *